United States Patent
Miyamoto et al.

(10) Patent No.: US 10,216,751 B2
(45) Date of Patent: Feb. 26, 2019

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventors: Daijiro Miyamoto, Kawasaki (JP); Makiya Tamura, Tokyo (JP); Natsuki Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 471 days.

(21) Appl. No.: 14/789,697

(22) Filed: Jul. 1, 2015

(65) Prior Publication Data

US 2016/0004713 A1    Jan. 7, 2016

(30) Foreign Application Priority Data

Jul. 3, 2014 (JP) .................... 2014-138142

(51) Int. Cl.
*G06F 17/30* (2006.01)
*H04L 29/08* (2006.01)

(52) U.S. Cl.
CPC .. *G06F 17/30123* (2013.01); *G06F 17/30082* (2013.01); *G06F 17/30126* (2013.01); *G06F 17/30221* (2013.01); *H04L 67/06* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 6,564,254 B1* | 5/2003 | Shoji | ................ | G06F 17/30864 345/168 |
| 8,286,085 B1* | 10/2012 | Denise | ................ | G06Q 10/107 715/752 |
| 8,671,100 B2* | 3/2014 | Kitayama | ........... | G06F 17/3002 707/741 |
| 2003/0033588 A1* | 2/2003 | Alexander | ................ | G06F 9/54 717/107 |
| 2003/0105589 A1 | 6/2003 | Liu | | |
| 2003/0220995 A1* | 11/2003 | Hitaka | ............... | H04N 1/00127 709/223 |
| 2004/0088281 A1* | 5/2004 | Matsuishi | ......... | G06F 17/30011 |
| 2004/0230966 A1 | 11/2004 | Morris | | |

(Continued)

FOREIGN PATENT DOCUMENTS

| CN | 102238304 A | 11/2011 |
|---|---|---|
| CN | 103020144 A | 4/2013 |

(Continued)

OTHER PUBLICATIONS

Windows XP for Dummies, 2001, pp. 187, 275.*

*Primary Examiner* — Wilson Lee
(74) *Attorney, Agent, or Firm* — Canon USA Inc., IP Division

(57) ABSTRACT

A method for controlling an information processing apparatus includes specifying a folder for storing a file among a plurality of folders, displaying character string candidates for setting a file name of a file based on a folder path of the specified folder, selecting a character string from a plurality of displayed character strings, and setting the selected character string as the file name of the file.

14 Claims, 23 Drawing Sheets

(56) References Cited

U.S. PATENT DOCUMENTS

| | | | |
|---|---|---|---|
| 2005/0089017 A1* | 4/2005 | Fukada | G06F 17/30884 |
| | | | 370/351 |
| 2005/0286805 A1* | 12/2005 | Yoshida | G06K 9/00463 |
| | | | 382/305 |
| 2006/0242591 A1 | 10/2006 | Van Dok | |
| 2007/0143349 A1* | 6/2007 | Iwasaki | G06F 17/30067 |
| 2008/0062471 A1 | 3/2008 | Matsuda | |
| 2010/0037235 A1* | 2/2010 | Larimore | G06F 9/455 |
| | | | 719/312 |
| 2013/0085997 A1* | 4/2013 | Kirihata | G06F 17/30619 |
| | | | 707/649 |
| 2014/0268246 A1* | 9/2014 | Ohguro | H04N 1/2166 |
| | | | 358/403 |
| 2015/0186362 A1* | 7/2015 | Li | G06F 17/2223 |
| | | | 704/3 |

FOREIGN PATENT DOCUMENTS

| | | |
|---|---|---|
| CN | 104469058 A | 3/2015 |
| EP | 2568696 A2 | 3/2013 |
| JP | 2001-188697 A | 7/2001 |
| JP | 2008-072256 A | 3/2008 |
| JP | 2010-055539 A | 3/2010 |
| JP | 4702932 B2 | 6/2011 |
| KR | 10-2008-0010088 A | 1/2008 |
| WO | 2014/032266 A1 | 3/2014 |

\* cited by examiner

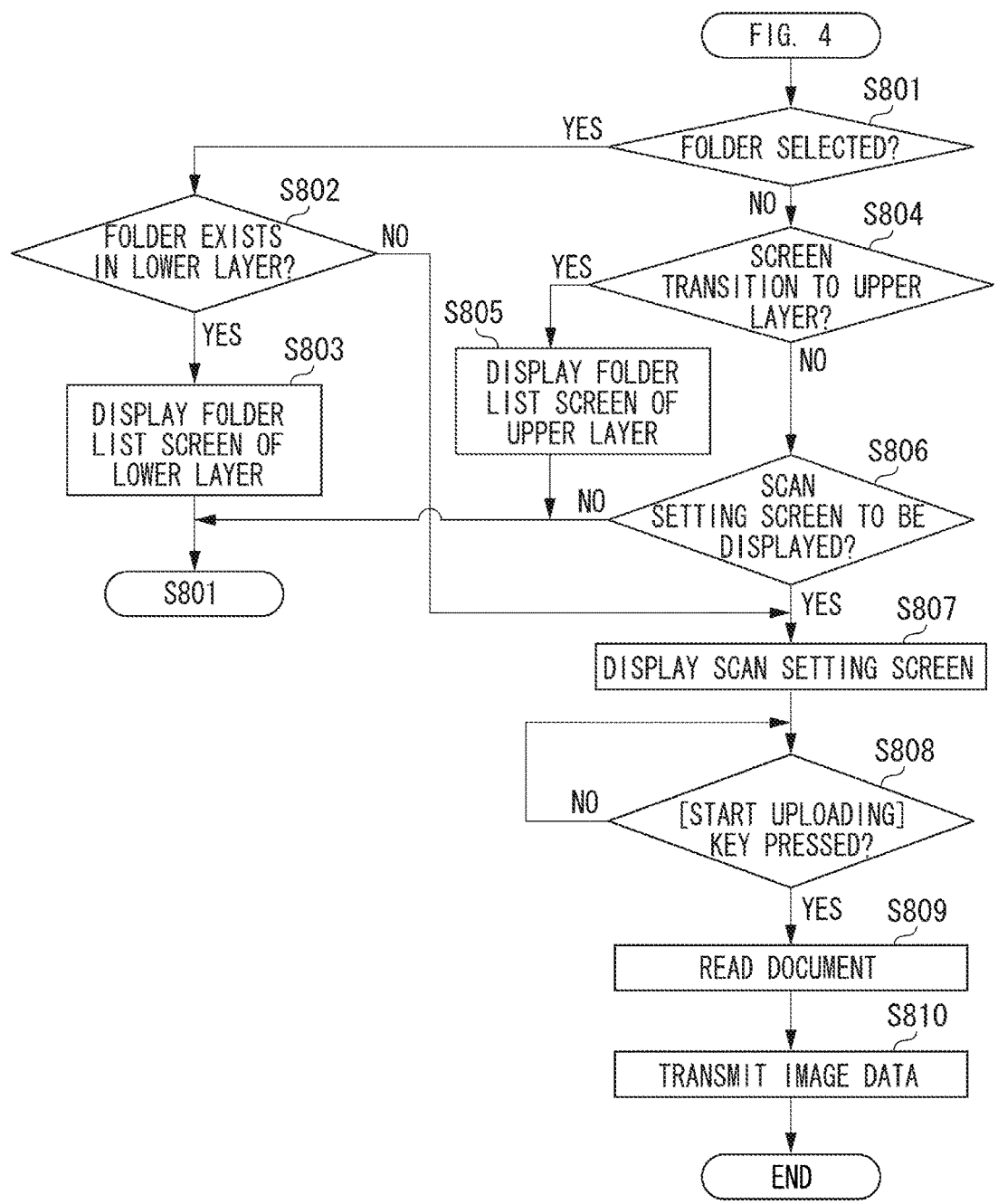

| 1 | 20140303120000 |
|---|---|
| 2 | Admission |
| 3 | Resignation |
| 4 | ChangeOfAddress |
| 5 | Contract |
| 6 | Aaron Smith |
| 7 | Student |

SCAN SETTING SCREEN 1200

SCAN SETTING SCREEN

/Berkely/Student/Aaron Smith/Contract — 1201

FILE NAME | Student_Aaron Smith_Contract ▼ — 3010

Aaron Smith_Contract_20140303120000

COLOR

Student_Aaron Smith_Contract_20140303120000

300 * 300 dpi

20140303120000

TWO-SIDED READING ▼ — 1205

NO MIXED ORIGINALS ▼ — 1206

CANCEL — 1208                START UPLOADING — 1209

FIG. 20

SETTING FILE 1600

[KEYWORD] —— 1601

1, ChangeOfAddress —— 1602
2, ChangeOfClass —— 1603
3, Resignation —— 1604

[RULE] —— 1605

<key:1>(<path:4>_<path:2>) —— 1606
<key:2>(<path:4>_<path:2>) —— 1607
<key:3>(<path:3>_<path:2>) —— 1608

FIG. 21

SCAN SETTING SCREEN 1200

SCAN SETTING SCREEN

📁 /Berkely/Student/Aaron Smith/Contract —1201

| FILE NAME | Aaron Smith_Contract_20140303120000 ▼ | —3010

ChangeOfAddress(Berkely_Aaron_Smith)

COLOR

ChangeOfClass(Berkely_Aaron_Smith)

300 * 300 dpi

Registration(Student_Aaron_Smith)

TWO-SIDED READING ▼ —1205

NO MIXED ORIGINALS ▼ —1206

✖ CANCEL —1208    START UPLOADING —1209

FIG. 23

SCAN SETTING SCREEN 1200

| SCAN SETTING SCREEN |
|---|

/Berkely/Student/Aaron Smith/Contract — 1201

| FILE NAME | Student_Aaron Smith_Contract ▼ | — 3010 |
| COLOR | ChangeOfAddress(Berkely_Aaron_Smith) | |
| | ChangeOfClass(Berkely_Aaron_Smith) | |
| 300 * 300 dpi | Registration(Student_Aaron_Smith) | |
| TWO-SIDED REA | Aaron Smith_Contract_20140303120000 | |
| NO MIXED ORIG | Student_Aaron Smith_Contract_20140303120000 | |
| ✕ CANCEL | 20140303120000 | |
| 1208 | START OF LOADING | 1209 |

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus, a method for controlling the information processing apparatus, and a storage medium.

Description of the Related Art

Conventionally, an information processing apparatus for storing a file in a specified folder is known.

The information processing apparatus is known to acquire information about hierarchically managed folders and display a list of folders on a display unit when specifying a folder to be used as a file storage destination (Japanese Patent Application Laid-Open No. 2008-072256). A user can specify an arbitrary folder as an image data storage destination based on the list of folders displayed on the display unit.

Each of the hierarchically managed folders is assigned a folder name according to the use of the relevant folder. For example, in the case of a system employed in a cram school, a folder having a folder name of "Student" and a folder having a folder name of "Teacher" are managed under the root folder. Under the folder having the folder name of "Student", folders assigned respective folder names of a plurality of students are managed. Further, under a folder assigned a folder name of each student name, a folder having a folder name of "Contract" indicating contracts and a folder having a folder name of "Test" indicating tests are managed.

Each of these folder names is assigned according to the use of the relevant folder in this way. However, it has been impossible to easily set a file name of a file to be stored in a folder by using a character string indicating the folder name of the relevant folder or by using character strings of folders included in a path up to the relevant folder.

SUMMARY OF THE INVENTION

According to an aspect of the present invention, an information processing apparatus includes a specification unit configured to specify a folder for storing a file among a plurality of folders, a display unit configured to display character string candidates for setting a file name of a file based on a folder path of the folder specified by the specification unit, a selection unit configured to select a character string from a plurality of character strings displayed by the display unit, and a setting unit configured to set the character string selected by the selection unit as the file name of the file.

Further features of the present invention will become apparent from the following description of exemplary embodiments with reference to the attached drawings.

BRIEF DESCRIPTION OF THE DRAWINGS

FIG. 8 is a flowchart illustrating an example of control according to the present exemplary embodiment.

FIG. 9 illustrates a screen according to the present exemplary embodiment.

FIG. 14 illustrates button information according to the present exemplary embodiment.

FIG. 16 illustrates a screen according to the present exemplary embodiment.

FIG. 17 illustrates a screen according to the present exemplary embodiment.

FIG. 20 illustrates a setting file according to the present exemplary embodiment.

FIG. 21 illustrates a screen according to the present exemplary embodiment.

FIG. 23 illustrates a screen according to the present exemplary embodiment.

DESCRIPTION OF THE EMBODIMENTS

Exemplary embodiments of the present invention will be described in detail below with reference to the accompanying drawings. The following exemplary embodiments do not limit the present invention within the ambit of the appended claims. Not all of the combinations of the features described in the exemplary embodiments are indispensable to the solutions for the present invention.

A first exemplary embodiment of the present invention will be described below.

Figure 1:
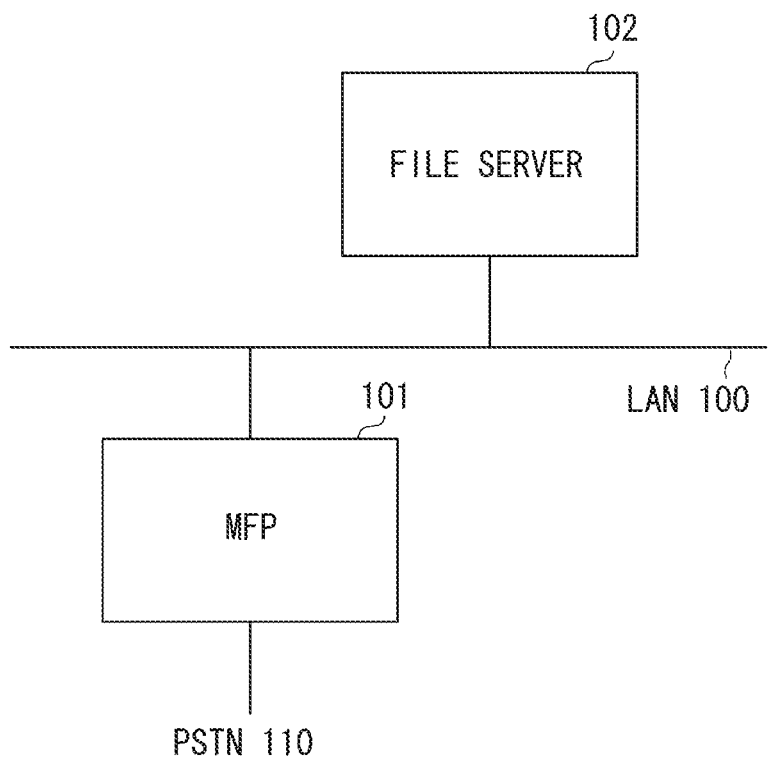
FIG. 1 illustrates an overall configuration of an information processing system according to exemplary embodiments of the present invention.

FIG. 1 illustrates an overall configuration of an information processing system. On a network (local area network (LAN)) 100, a multifunction peripheral (MFP) 101 and a file server 102 are communicably connected with each other. The MFP 101 is an example of an information processing apparatus. Although the MFP 101 will be described as an example of an information processing apparatus, the MFP 101 may be replaced, for example, with a personal computer (PC) or a mobile terminal as long as it is provided with a function of assigning a file name to a file.

The file server 102 is an example of an external apparatus. Although the information processing system includes the MFP 101 and the file server 102, only the MFP 101 may be referred to as an information processing system. The MFP 101 is also connected to a Public Switched Telephone Network (PSTN) 110 to perform facsimile communication of image data with a facsimile apparatus (not illustrated).

Figure 2:
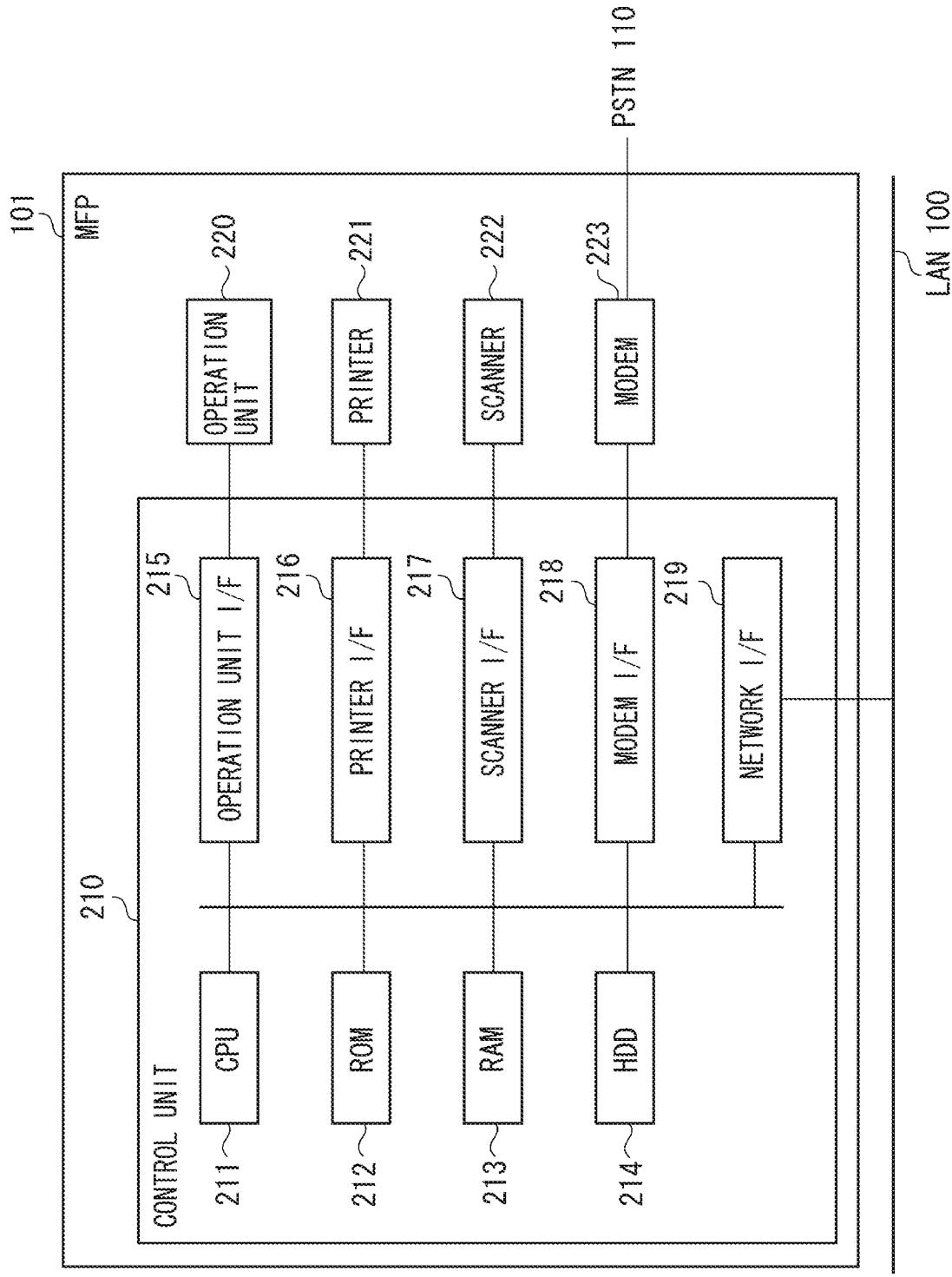
FIG. 2 is a block diagram illustrating a configuration of a multifunction peripheral (MFP) according to exemplary embodiments of the present invention.

FIG. 2 illustrates a hardware configuration of the MFP 101.

A control unit 210 including a central processing unit (CPU) 211 controls operations of the entire MFP 101.

The CPU 211 reads a control program stored in a read only memory (ROM) 212 and performs various control such as reading, printing, and communication.

A random access memory (RAM) 213 is used as a main memory for the CPU 211 and a temporary storage area such as a work area. Although, in the MFP 101, one CPU 211 (described below) executes each step of flowcharts (described below) by using one memory (the RAM 213 or a hard disk drive (HDD) 214), other mode is also applicable. For example, it is also possible to cause a plurality of CPUs and a plurality of RAMs or HDDs to work together to execute each step of the flowcharts.

The HDD 214 stores image data and various programs. An operation unit interface (I/F) 215 connects the control unit 210 with an operation unit 220. The operation unit 220 is provided with a liquid crystal display (LCD) unit having touch-panel functions and a keyboard, and serves as a receiving unit for receiving operations, inputs, and instructions from the user.

A printer I/F 216 connects the control unit 210 with a printer 221. Image data to be printed by the printer 221 is transmitted from the control unit 210 to the printer 221 via the printer I/F 216 and then is printed on a recording medium by the printer 221.

A scanner I/F 217 connects the control unit 210 with a scanner 222. The scanner 222 reads an image on a document, generates relevant image data, and inputs the data to the control unit 210 via the scanner I/F 217. Then, after the MFP 101 stores as a file the image data generated by the scanner 222, the MFP 101 can transmit the file to the file server 102 based on the (Web-based Distributed Authoring and Versioning (WebDAV) protocol. "Storing image data as a file" refers to generating a file storing the image data, with any desired file format such as Portable Document Format (PDF) and Tag Image File Format (TIFF). In the following descriptions, image data stored as a file is referred to as an image file. Instead of WebDAV, File Transfer Protocol (FTP) or Server Message Block (SMB) may be applied.

A modulator-demodulator (modem) I/F 218 connects the control unit 210 with a modem 223. The modem 223 performs facsimile communication of image data with a facsimile apparatus (not illustrated). A network I/F 219 connects the control unit 210 (MFP 101) to a LAN 100. The MFP 101 transmits an image file and information and receives various kinds of information to/from an external apparatus (such as the file server 102) on the LAN 100 via the network I/F 219.

Figure 3:
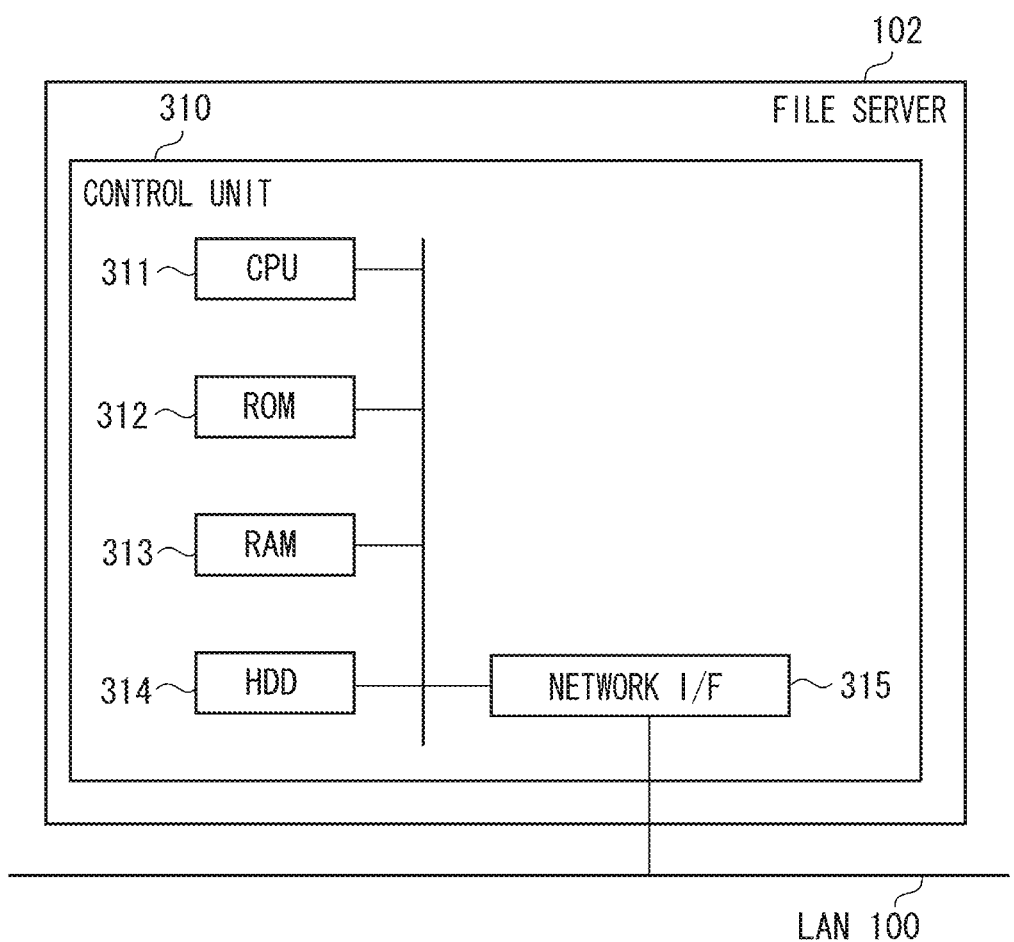
FIG. 3 is a block diagram illustrating a configuration of a file server according to exemplary embodiments of the present invention.

FIG. 3 illustrates a hardware configuration of the file server 102. A control unit 310 including a CPU 311 controls operations of the entire file server 102. The CPU 311 reads a control program stored in a ROM 312 and executes various control processing. A RAM 313 is used as a main memory for the CPU 311 and a temporary storage area such as a work area. A HDD 314 stores image data and various programs. The HDD 314 further stores a plurality of hierarchically managed folders. Image files transmitted from the MFP 101 can be stored in these folders. Image files stored in the folders can be browsed and operated from a PC (not illustrated) on the LAN 100.

A network I/F 315 connects the control unit 310 (file server 102) to the LAN 100. The file server 102 transmits and receives various kinds of information to/from other apparatuses on the LAN 100 via the network I/F 315.

Operations of the information processing system (services provided by using the information processing system) will be described below using a cram school supporting system as an example. A cram school supporting system refers to a system for efficiently managing cram school business which handles a large volume of documents printed on paper. In particular, the cram school supporting system facilitates operations for reading such documents by using a scanner and uploading data to the file server 102. The cram school supporting system is implemented by using an application named "Cram School Filing" installed in the MFP 101, and a file system in the file server 102 for hierarchically managing a plurality of folders.

Figure 15:
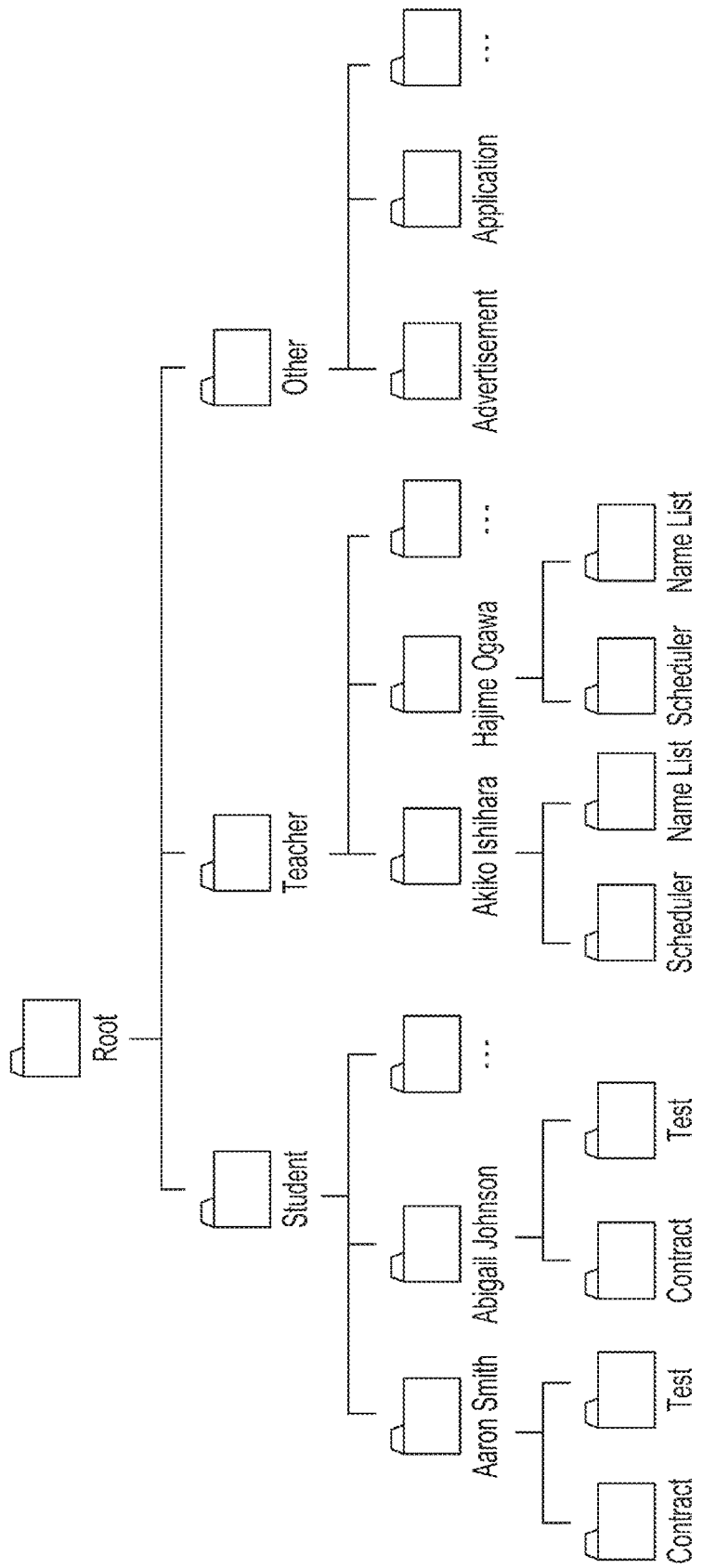
FIG. 15 illustrates hierarchically managed folders according to the present exemplary embodiment.

FIG. 15 illustrates an example of a plurality of folders hierarchically managed by the file server 102. Under the root folder, folders named [Student], [Teacher], and [Other] are managed. Further, under the folder [Student], a plurality of folders for respective students are managed. Further, under each student folder, a folder named "Contract" for storing contracts and a folder named "Test" for storing tests for each student are managed. Further, under the folder [Teacher], a plurality of folders for respective teachers are managed. Further, under each teacher's folder, a folder named "Scheduler" for storing schedules and a folder named "Name List" for storing name lists for each teacher are managed. This is an example and any other folders may be managed. Further, the number of folder layers is not limited thereto and any other number of folder layers may be managed.

Figure 4:
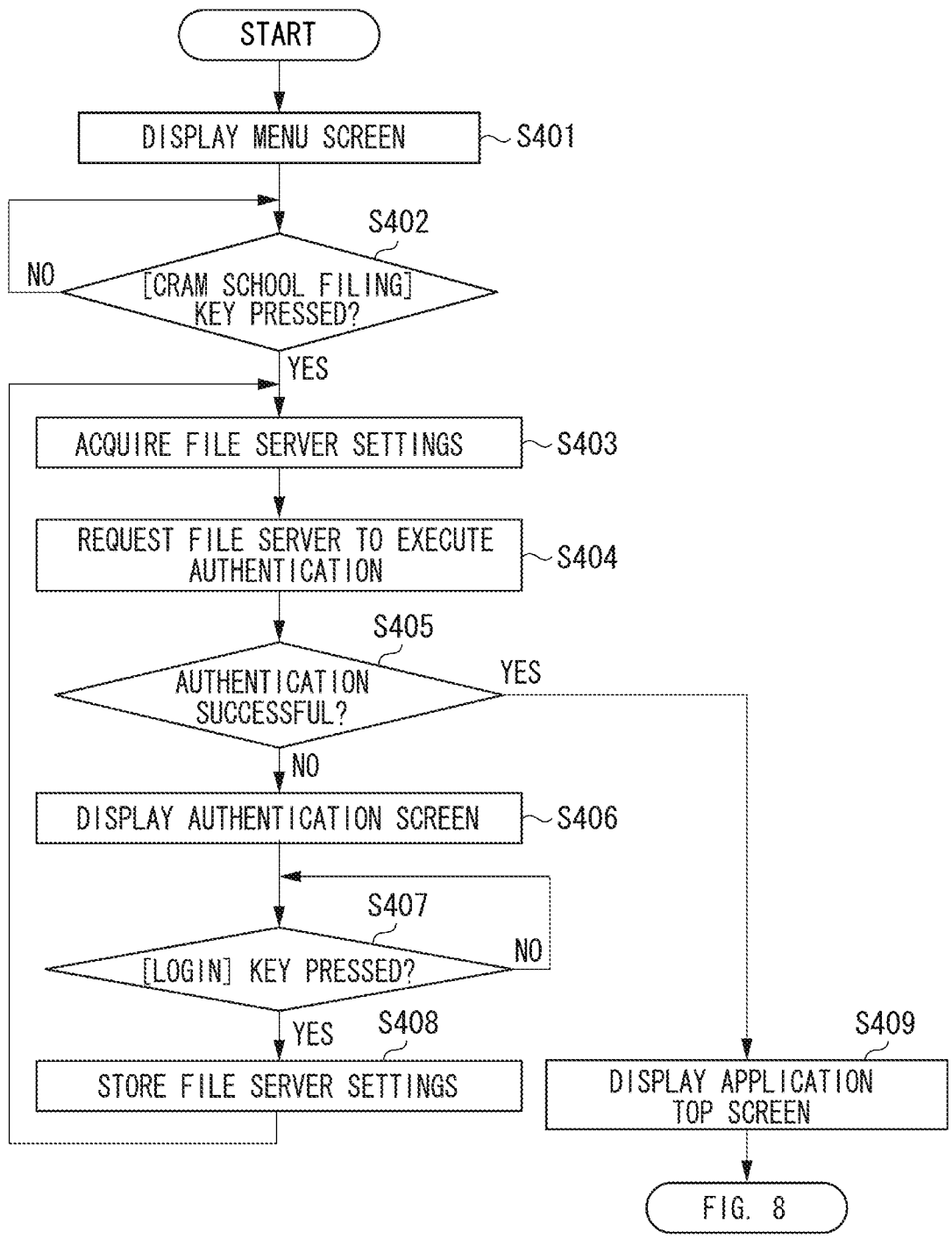
FIG. 4 is a flowchart illustrating an example of control according to the present exemplary embodiment.

FIG. 4 is a flowchart illustrating operations performed after the MFP 101 is activated until an application top screen 610 of "Cram School Filing" is displayed. Each operation (step) in the flowchart illustrated in FIG. 4 is implemented when the CPU 211 of the MFP 101 executes a control program stored in the HDD 214.

Figure 5A:
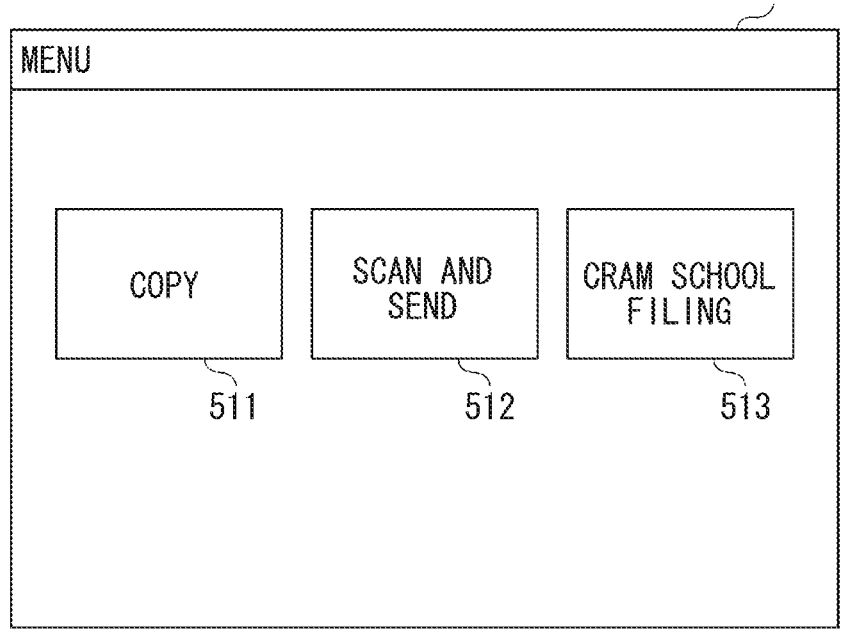
FIGS. 5A and 5B illustrate screens according to the present exemplary embodiment.

In step S401, the CPU 211 displays a menu screen 510 illustrated in FIG. 5A on the operation unit 220. The menu screen 510 displays a list of functions and applications provided by the MFP 101. A [Copy] key 511 and a [Scan and Send] key 512 illustrated in FIG. 5A are used corresponding to functions (native functions) standardly provided by the MFP 101. On the other hand, a [Cram School Filing] key 513 is used corresponding to a Java (registered trademark)-based application additionally installed in the MFP 101. The MFP 101 may be provided with other native functions and other applications (not illustrated).

In step S402, the CPU 211 determines whether the [Cram School Filing] key 513 has been pressed. When the [Cram School Filing] the key 513 is pressed (YES in step S402), the processing proceeds to step S403. On the other hand, when the relevant key is not pressed (NO in step S402), the processing waits until the relevant key is pressed. When the [Copy] key 511 or the [Scan and Send] key 512 is pressed, a function corresponding to each key is executed.

In step S403, the CPU 211 acquires file server settings stored in the HDD 214. The file server settings are provided as a comma separated value (CSV) format file or an extended markup language (XML) format file which stores information about the file server 102. The file server settings include the host name of the file server 102 and information about the root folder (folder path's starting point). The file server settings further include authentication information (an identifier (ID) and a password) for logging into the file server 102. An administrator or a user of the MFP 101 needs to input in advance each piece of information included in the file server settings via a file server setting screen displayed on the PC (not illustrated).

In step S404, the CPU 211 requests the file server 102 to execute authentication based on the file server settings acquired in step S403. If this authentication is successful, the MFP 101 can access the file server 102.

In step S405, the CPU 211 determines whether authentication by the file server 102 is successful and the MFP 101 has logged into the file server 102. When authentication is successful (YES in step S405), the processing proceeds to step S409. On the other hand, when authentication fails (NO in step S405), the processing proceeds to step S406.

Figure 5B:
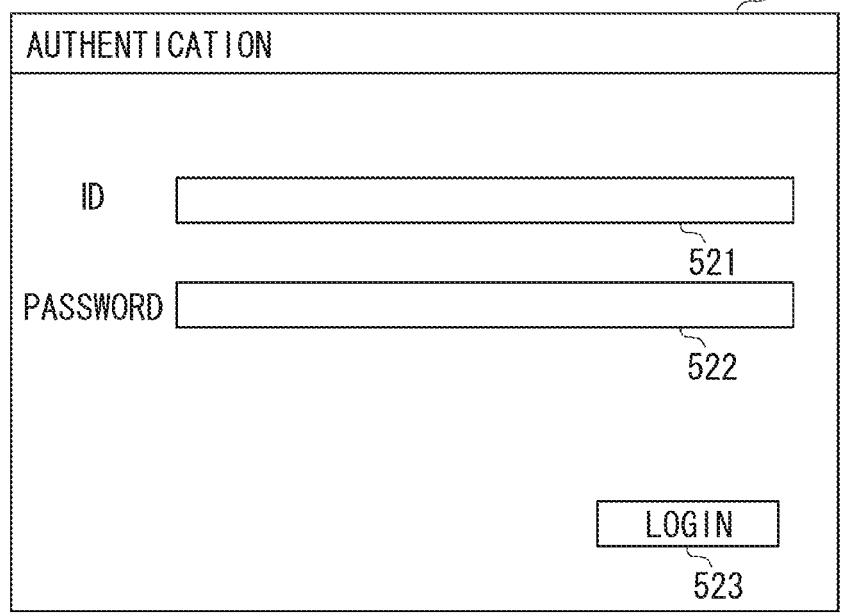

In step S406, the CPU 211 displays an authentication screen 520 illustrated in FIG. 5B on the operation unit 220. When authentication by the file server 102 fails (NO in step S405), the authentication information included in the file server settings may possibly be erroneous. In this case, therefore, the CPU 211 prompts the user to input the authentication information via the authentication screen 520. In step S407, the CPU 211 determines whether a [Login] key 523 has been pressed. When the [Login] key 523 is pressed (YES in step S407), the processing proceeds to step S408. On the other hand, when the relevant key is not pressed (NO in step S407), the processing waits until the relevant key is pressed.

In step S408, the CPU 211 stores in the HDD 214 the authentication information input by the user, and the processing returns to step S403. Although executing the processing in step S408 makes it unnecessary for the user to input the authentication information at the time of subsequent login operations, processing in steps S408 and S403 may be omitted and the processing may proceed to step S404. Alternatively, after the processing in steps S408 and S403 is omitted and the processing proceeds to step S404, the CPU 211 may determine that authentication is successful in step S405 and then store the authentication information.

Figure 6A:
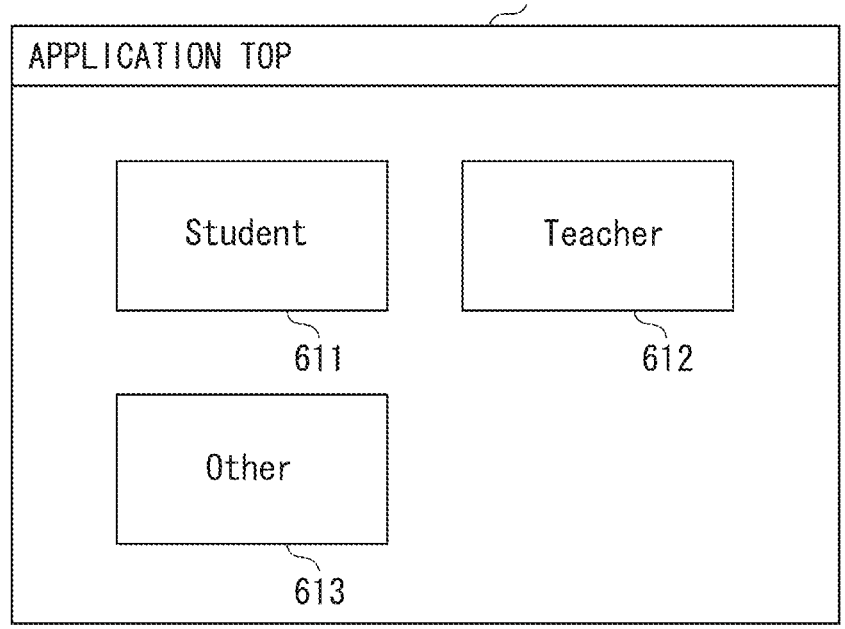
FIGS. 6A and 6B illustrate screens according to the present exemplary embodiment.

In step S409, the CPU 211 displays the application top screen 610 illustrated in FIG. 6A on the operation unit 220. The application top screen 610 displays a [Student] key 611, a [Teacher] key 612, and an [Other] key 613. In the cram school supporting system, a folder named [Student], a folder named [Teacher], and a folder named [Other] are created immediately under the root folder. When displaying the application top screen 610, the MFP 101 acquires from the file server 102 information about the folders placed immediately under the root folder. Then, the MFP 101 displays the [Student] key 611, the [Teacher] key 612, and the [Other] key 612 based on the relevant information.

When uploading a document related to each student enrolled in a cram school to the file server 102, the user presses the [Student] key 611. When uploading a document related to each teacher to the file server 102, the user presses the [Teacher] key 612. When uploading any other documents to the file server 102, the user presses the [Other] key 613.

Figure 6B:
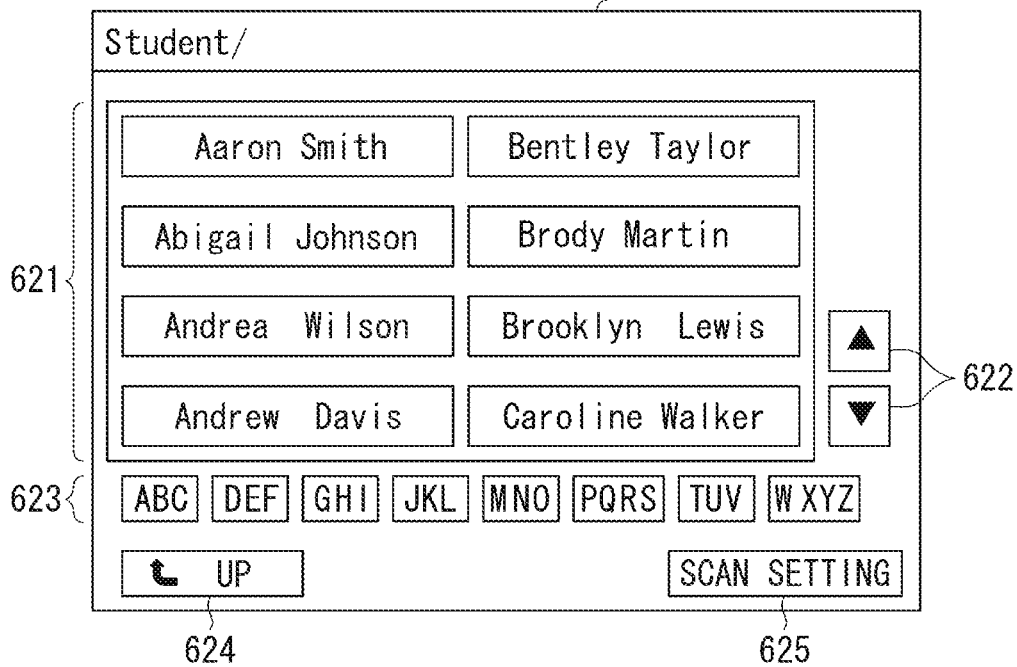

When the user presses the [Student] key 611, a student list screen 620 illustrated in FIG. 6B is displayed on the operation unit 220. An area 621 displays a list of student names registered in the cram school supporting system. Immediately under the folder [Student], subfolders having a student name set as the folder name are generated for the number of students. When displaying the student list screen 620, the MFP 101 acquires from the file server 102 information about the folders placed immediately under the [Student] folder, and displays the area 621 based on the relevant information. A new folder for each student can be generated and an existing one can be deleted through an operation from a PC (not illustrated). Further, student folders are sorted in alphabetical order and displayed by the MFP 101.

Scroll keys 622 are used for scrolling the screen to display in the area 621 student names that are not displayed in the area 621. Index keys 623 are used for specifying starting characters of the student names to display the student names in the area 621. An [Up] key 624 is used for displaying the folder in one-level upper layer. When the user presses the [Up] key 624, the application top screen 610 is displayed. A [Scan Setting] key 625 is used for displaying a scan setting screen (described below). When the scan setting screen is displayed by using the [Scan Setting] key 625, an image file generated by using the scanner 222 is to be stored in the [Student] folder. If image data is not permitted to be stored in the [Student] folder, the [Scan Setting] key 625 may not be displayed.

Figure 7A:
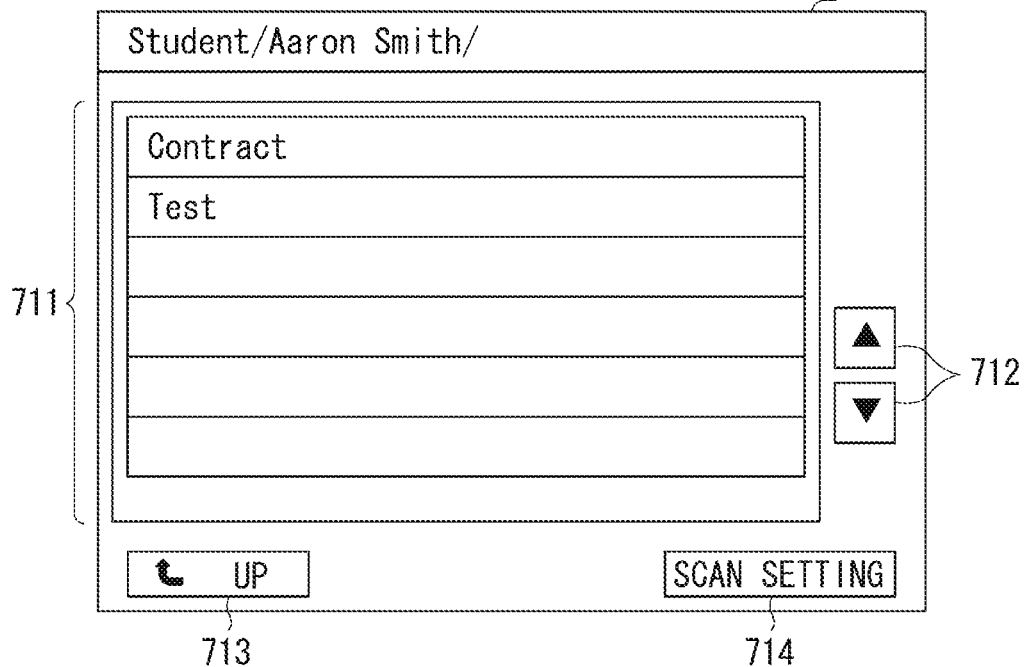
FIGS. 7A and 7B illustrate screens according to the present exemplary embodiment.

When the user presses any one of the operation keys included in the area 621, a document type list screen 710 illustrated in FIG. 7A is displayed. FIG. 7A illustrates a case where a student named [Aaron Smith] (a folder named [Aaron Smith]) is selected. An area 711 displays a list of document types registered in the cram school supporting system. Immediately under the folder [Aaron Smith], subfolders having a document type name set as the folder name are generated. In the example illustrated in FIG. 7A, respective subfolders named [Contract] and [Test] are stored. These folders are similarly generated immediately under other students' folders.

When displaying the document type list screen 710, the MFP 101 acquires from the file server 102 information about the folders placed immediately under the [Aaron Smith] folder, and displays the area 711 based on the relevant information. A new folder for each document type can be generated and an existing one can be deleted through an operation from a PC (not illustrated).

Scroll keys 712 are used for scrolling the screen to display in the area 711 document types that are not displayed in the area 711. Since there are only two folders immediately under the [Aaron Smith] folder, all of the relevant folders are displayed on the document type list screen 710 illustrated in FIG. 7A. When there are seven or more folders, all of the relevant folders cannot be displayed at one time. Therefore, the scroll keys 712 are used. Unlike the student list screen 620, index keys are not displayed in the document type list screen 710. An [Up] key 713 is used for displaying the folder in one-level upper layer. When the user presses the [Up] key 713, the student list screen 620 is displayed. A [Scan Setting] key 714 is used for displaying the scan setting screen (described below). When the scan setting screen is displayed by using the [Scan Setting] key 714, an image file generated by using the scanner 222 is to be stored in the [Aaron Smith] folder.

Figure 7B:
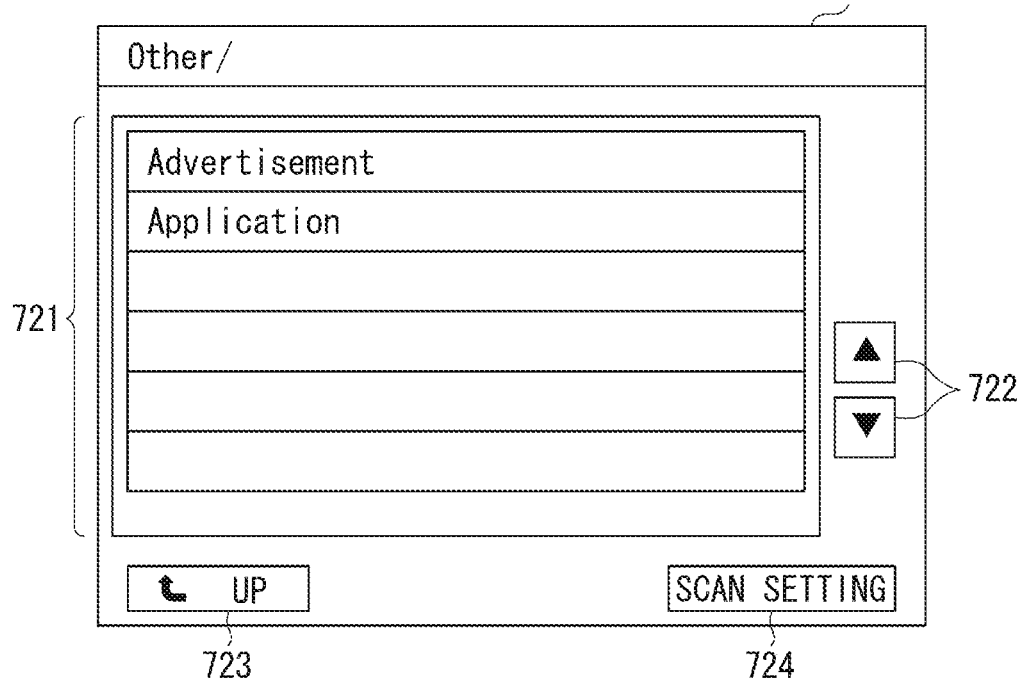

When the user presses the [Other] key 613 in the application top screen 610 illustrated in FIG. 6A, a document type list screen 720 illustrated in FIG. 7B is displayed. An area 721 displays a list of document types registered in the cram school supporting system. Immediately under the [Other] folder, subfolders having a document type name set as the folder name are generated. When displaying the document type list screen 720, the MFP 101 acquires from the file server 102 information about the folders placed immediately under the [Other] folder, and displays the area 721 based on the relevant information. A new folder for each document type can be generated and an existing one can be deleted through an operation from a PC (not illustrated).

Scroll keys 722 are used for scrolling the screen to display in the area 721 document types that are not displayed in the area 721. Since there are only two folders immediately under the [Other] folder, all of the relevant folders are displayed in the document type list screen 720 illustrated in FIG. 7B. When there are seven or more folders, all of the relevant folders cannot be displayed at one time. Therefore, the scroll keys 722 are used. Unlike the student list screen 620, index keys are not displayed in the document type list screen 720. An [Up] key 723 is used for displaying the folder in one-level upper layer. When the user presses the [Up] key 723, the application top screen 610 is displayed. A [Scan Setting] key 724 is used for displaying the scan setting screen (described below). When the scan setting screen is displayed by using the [Scan Setting] key 724, an image file generated by using the scanner 222 is to be stored in the [Other] folder.

FIG. 8 is a flowchart illustrating operations performed by the MFP 101 including screen transitions after the application top screen 610 is displayed. Each operation (step) in the flowchart illustrated in FIG. 8 is implemented when the CPU 211 of the MFP 101 executes a control program stored in the HDD 214.

In step S801, the CPU 211 determines whether the folder is selected by the user. When the user presses any one of the [Student] key 611, the [Teacher] key 612, the [Other] key 613, and the operation keys included in the areas 621, 711, and 721, i.e., the CPU 211 determines that a folder is selected by the user (YES in step S801), and the processing proceeds to step S802.

In step S802, the CPU 211 determines whether the folder selected in step S801 has a subfolder. The CPU 211 makes this determination by making an inquiry to the file server 102 about whether a subfolder is present. When the user presses any one of the [Student] key 611, the [Teacher] key 612, the [Other] key 613, and the operation keys included in the area 621, i.e., the CPU 211 determines that the selected folder has a subfolder (YES in step S802), and the processing proceeds to step S803. On the other hand, when the user presses any one of the operation keys included in the areas 711 and 721, i.e., when the CPU 211 determines that the selected folder has no subfolder (NO in step S802), the processing proceeds to step S807. Even in a case where a file is placed immediately under the selected folder, it is determined that the selected folder has no subfolder as long as no folder exists immediately thereunder.

In step S803, the CPU 211 displays a list of folders placed immediately under the folder selected in step S801 (folders in one-level lower layer of the folder selected in step S801). Specifically, the CPU 211 performs a screen transition from FIG. 6A to FIG. 6B or FIG. 7B or a screen transition from FIG. 6B to FIG. 7A.

In step S804, the CPU 211 determines whether the user has given an instruction to perform a screen transition to the upper layer. In this case, when the user presses any one of the [Up] keys 624, 713, and 723, i.e., the CPU 211 determines that the user has given an instruction to perform a screen transition to the upper layer (YES in step S804), and the processing proceeds to step S805. In step S805, the CPU 211 display a list of the folders in one-level upper layer of the currently displayed layer. Specifically, the CPU 211 performs a screen transition from FIG. 6B or FIG. 7B to FIG. 6A or a screen transition from FIG. 7A to FIG. 6B.

In step S806, the CPU 211 determines whether the user has given an instruction to display the scan setting screen. In this case, when the user presses any one of the [Scan Setting] keys 625, 714, and 724, i.e., the CPU 211 determines that the user has given an instruction to display the scan setting screen (YES in step S806), and the processing proceeds to step S807.

Figure 9:
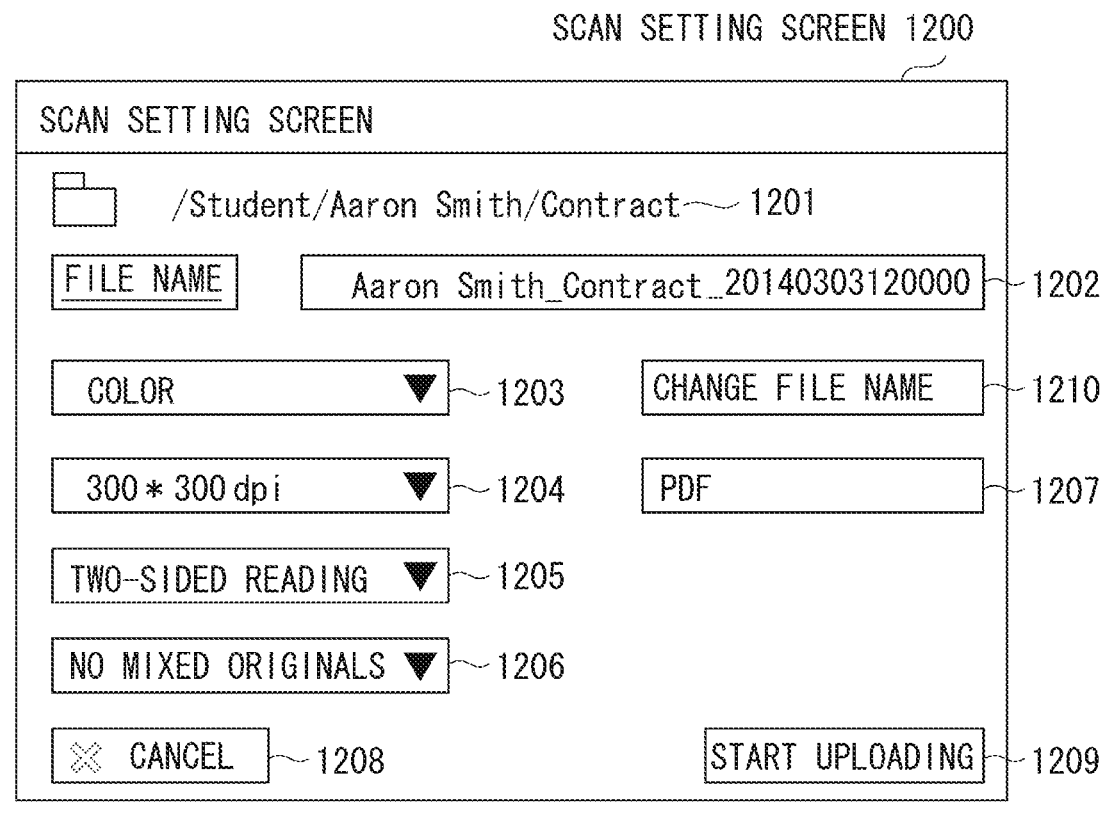

In step S807, the CPU 211 displays a scan setting screen 1200 illustrated in FIG. 9. FIG. 9 illustrates a screen which is displayed when the folder named [Contract] under the student folder [Aaron Smith] under the [Student] folder is selected in the document type list screen 710 illustrated in FIG. 7A. An area 1201 displays folder path information which indicates a storage destination of an image file to be generated by using the scanner 222. This folder path information indicates a relative path to the root folder (lower-level layers of the root folder). In the example illustrated in FIG. 9, the [Contract] folder is selected as an image file storage destination.

A [File Name] area 1202 displays the currently set file name. In the example illustrated in FIG. 9, a file name generated by the CPU 211 is set as a default file name. A method for setting a default file name will be described below with reference to the flowchart illustrated in FIG. 11.

Figure 10:
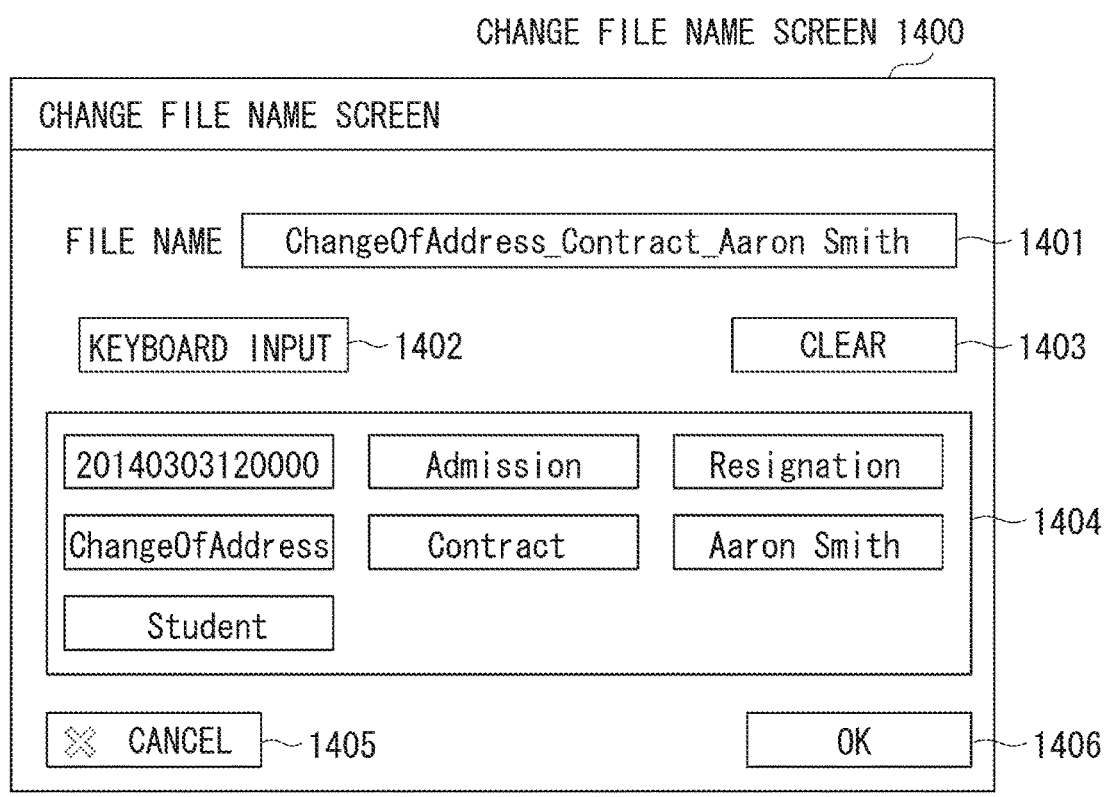
FIG. 10 illustrates a screen according to the present exemplary embodiment.

A [Change File Name] key 1210 is used for setting a file name of an image file. When the user presses the [Change File Name] key 1210, a Change File Name screen 1400 for changing a file name is displayed on the operation unit 220. FIG. 10 illustrates an example of the Change File Name screen 1400 to be described in detail below.

Operation keys 1203 to 1207 are used for setting document reading parameters. Reading parameters may include other types in addition to the illustrated ones, and a part of the illustrated reading parameters may be excluded.

The operation key 1203 is used for setting the color mode. The user can select a desired color mode from the pull-down menu options: [Color], [Gray Scale], and [Monochrome]. The operation key 1204 is a used for setting the resolution. The user can select a desired resolution from the pull-down menu options: [300*300 dpi] and [200*200 dpi].

The operation key 1205 is used for setting the one-sided reading mode or the two-sided reading mode. The user can select a desired reading mode from the pull-down menu options: [Two-Sided Reading] and [One-Sided Reading]. The operation key 1206 is used for setting a mixed originals mode. The user can select a desired mixed-originals mode from the pull-down menu options: [Mixed Originals] and [No Mixed Originals].

The operation key 1207 is used for setting the file format. The user can select a desired file format from options: [TIFF], [PDF], and [PDF+High Compression].

The reading parameters set by the operation keys 1203 to 1207 are stored in the RAM 213 and are read by the CPU 211 when reading a document.

When the user presses a [Cancel] key 1208, scan setting can be cancelled and the storage destination can be changed to other folders. When the CPU 211 determines that a [Start Uploading] key 1209 is pressed (YES in step S808), the processing proceeds to step S809. On the other hand, when the [Start Uploading] key 1209 is not pressed (NO in step S808), the processing waits until the relevant key is pressed. In step S809, the CPU 211 instructs the scanner 222 to read a document according to the reading parameters set by the operation keys 1203 to 1207. In step S810, the CPU 211 converts read image data into an image file, assigns the file name displayed in the [File Name] area 1202 to the image file, and transmits the relevant image file to the file server 102.

The screen illustrated in FIG. 10 displayed when the [Change File Name] key 1210 is pressed will be described below. The screen illustrated in FIG. 10 is the Change File Name screen 1400 for changing the file name displayed in the [File Name] area 1202 illustrated in FIG. 9.

The Change File Name screen 1400 displays a [File Name] area 1401 for displaying the currently set file name, a [Keyboard Input] key 1402, a [Clear] key 1403, and a [File Name Candidates] area 1404. The Change File Name screen 1400 further displays a [Cancel] key 1405 for cancelling the change and returning to the previous screen, and an [OK] key 1406 for applying the change.

When the user presses the [Keyboard Input] key 1402, a software keyboard for inputting a file name is displayed. The CPU 211 inputs as a file name a character string received from the user via the software keyboard.

The [Clear] key 1403 is used for deleting the currently set file name displayed in the [File Name] area 1401.

The [File Name Candidates] area 1404 is an area for displaying file name candidate buttons corresponding to the date and time, the character strings registered in advance, and the character strings acquired from the folder path. The user inputs a file name by selecting desired file name candidate buttons among the file name candidate buttons displayed in the [File Name Candidates] area 1404. The input file name is displayed in the [File Name] area 1401. When the user selects a plurality of character strings, the selected plurality of character strings is displayed while being sorted in order of selection.

In the Change File Name screen 1400 illustrated in FIG. 10, [Aaron Smith_Contract_20140303120000] set as a default file name illustrated in FIG. 9 is deleted by the [Clear] key 1403, and a new file name is set. In this case, after the previous file name is deleted by the [Clear] key 1403, [ChangeOfAddress], [Contract], and [Aaron Smith] in the [File Name Candidates] area 1404 are continuously pressed, and a new file name is set. The CPU 211 inserts an underbar "_" between the selected character strings as a delimiter. The sign inserted between character strings is not limited to "_", and other signs may be used as a delimiter. The sign to be used may be preset among a plurality of signs by the user.

When the user presses the [OK] key 1406 with a file name set, the CPU 211 stores the set file name in the HDD 214 and displays on the operation unit 220 the scan setting screen 1200 illustrated in FIG. 9. In this case, the set file name [ChangeOfAddress_Contract_Aaron Smith] is displayed in the [File Name] area 1202 illustrated in FIG. 9.

Then, when the user presses the [Start Uploading] key 1209 in the scan setting screen 1200 illustrated in FIG. 9 (YES in step S808), the processing proceeds to step S809.

In step S809, the CPU 211 instructs the scanner 222 to read a document to generate image data of the read document according to the settings made in the scan setting screen 1200. Then, the CPU 211 converts the image data into an image file and then assigns the file name displayed in the [File Name] area 1202 to the converted image file. In step S810, the CPU 211 transmits the image file to the file server 102.

Figure 11:
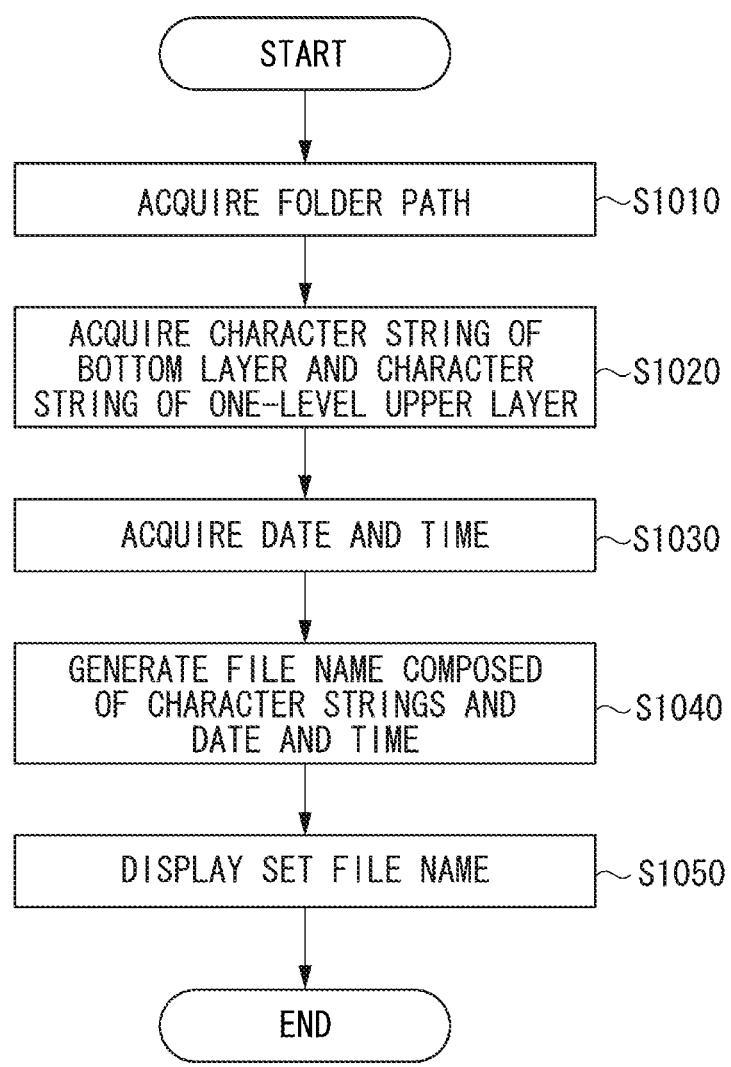
FIG. 11 is a flowchart illustrating an example of control according to the present exemplary embodiment.

FIG. 11 is a flowchart illustrating operations performed by the MFP 101 to display a default file name on the scan setting screen 1200 illustrated in FIG. 9 displayed in step S807. Each operation (step) in the flowchart illustrated in FIG. 11 is implemented when the CPU 211 of the MFP 101 executes a control program stored in the HDD 214.

In step S1010, the CPU 211 acquires a folder path. In the case of the example illustrated in FIG. 9, a folder path [/Student/Aaron Smith/Contract] is acquired.

In step S1020, among the folder path acquired in step S1010, the CPU 211 identifies the character string of the folder in the bottom layer and the character string of the folder in one-level upper layer. In the case of the example illustrated in FIG. 9, the CPU 211 identifies the character string "Contract" of the folder in the bottom layer and the character string "Aaron Smith" of the folder in one-level upper layer.

In step S1030, the CPU 211 acquires the present date and time from a timer (not illustrated) included in the MFP 101.

In step S1040, the CPU 211 generates a file name composed of the character strings identified in step S1020 and the date and time acquired in step S1030.

In step S1050, the CPU 211 displays the generated file name in the [File Name] area 1202 of the operation unit 220.

In the example illustrated in FIG. 9, since the scan setting screen 1200 illustrated in FIG. 9 is displayed at 12:00:00 on Mar. 3, 2014, [Aaron Smith_Contract_201403031200] is generated and displayed as a default file name. The CPU 211 inserts [_(underbar)] as a delimiter between character strings. Although the present exemplary embodiment is described to insert an [_(underbar)], other signs may be used. The sign to be inserted may be changed in advance from the operation unit 220 or an external apparatus by the user.

Further, an extension of a file may be included at the end of the file name. Further, the root folder may be included at the top of the file name.

Figure 12:
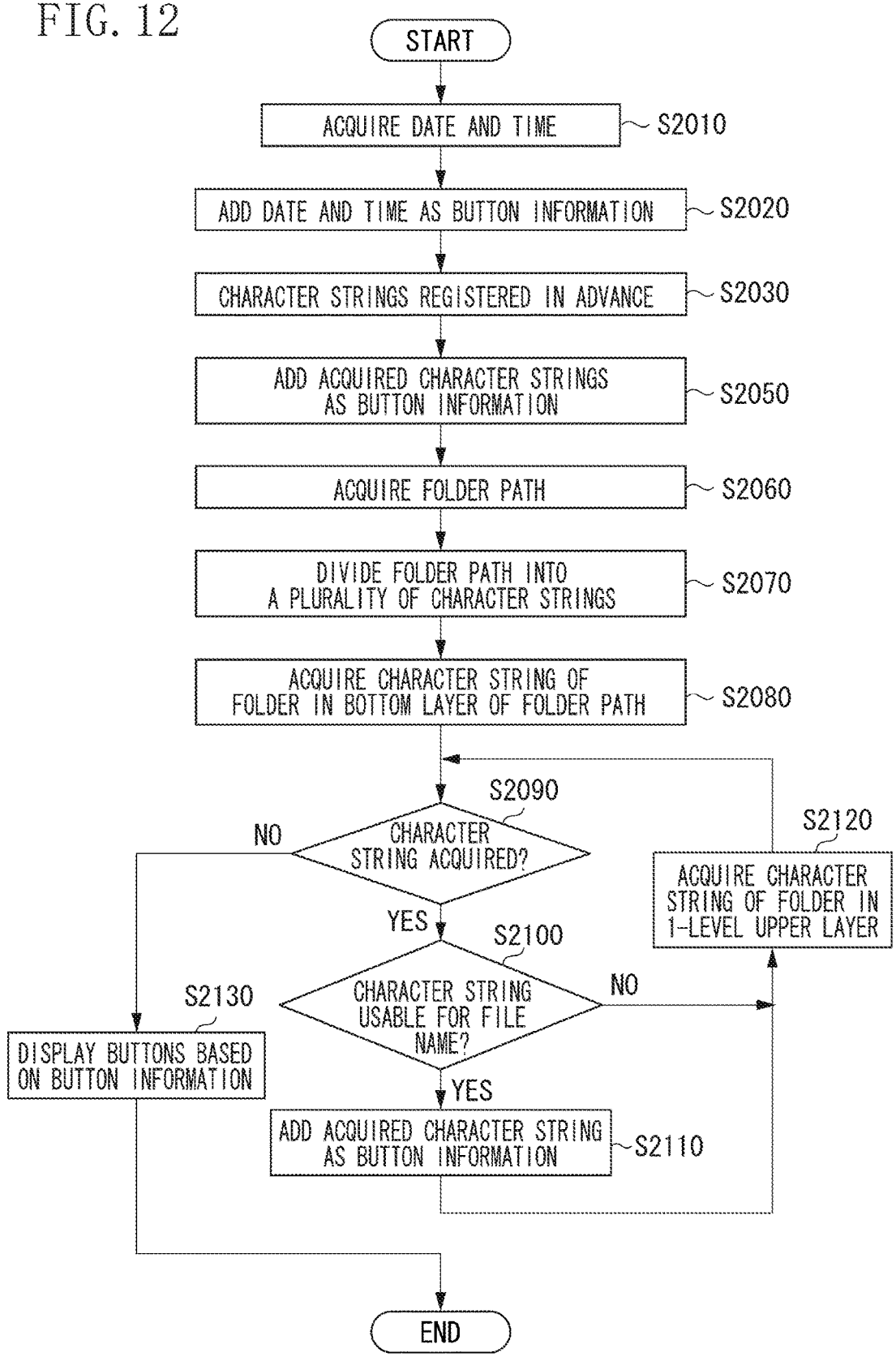
FIG. 12 is a flowchart illustrating an example of control according to the present exemplary embodiment.

FIG. 12 is a flowchart illustrating operations performed by the MFP 101 to display file name candidate buttons for inputting a file name in the [File Name Candidates] area 1404 of the Change File Name screen 1400 illustrated in FIG. 10. Each operation (step) in the flowchart illustrated in FIG. 12 is implemented when the CPU 211 of the MFP 101 executes a control program stored in the HDD 214.

In step S2010, the CPU 211 acquires the present date and time from a timer (not illustrated).

In step S2020, the CPU 211 adds the present date and time acquired in step S2010 as button information for displaying a file name candidate button. FIG. 14 illustrates an example of a list of button information generated, as a result of performing the processing of the flowchart illustrated in FIG. 12. Referring to the example illustrated in FIG. 14, the time 12:00:00 on Mar. 3, 2014 is acquired in step S2010, and button information "2014030312000" in the first line is stored in step S2020.

Figure 13:
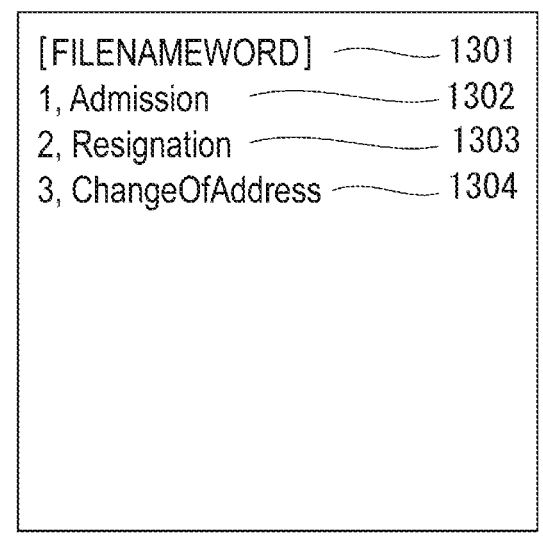
FIG. 13 illustrates registered character strings according to the present exemplary embodiment.

In step S2030, the CPU 211 acquires character strings registered in advance in the HDD 214. FIG. 13 illustrates the character strings registered in advance in the HDD 214. In the example illustrated in FIG. 13, [Admission] 1302, [Registration] 1303, and [ChangeOfAddress] 1304 are registered for FILENAMEWORD 1301. These respective character strings are registered together with numbers "1", "2", and "3".

In step S2050, the CPU 211 adds the character strings acquired in step S2030 as button information in ascending order of the number illustrated in FIG. 13. In the example illustrated in FIG. 14, [Admission] is stored as the second line, [Registration] is stored as the third line, and [ChangeOfAddress] is stored as the fourth line.

In step S2060, the CPU 211 acquires the folder path ranging from the folder path's starting point to the folder selected as a storage destination. When the Change File Name screen 1400 illustrated in FIG. 10 is called from the scan setting screen 1200 illustrated in FIG. 9, a folder path [/Student/Aaron Smith/Contract] illustrated in FIG. 9 is acquired.

In step S2070, the CPU 211 delimits the character string included in the folder path acquired in step S2060 with slashes "/" to divide the relevant character string into a plurality of character strings. When the Change File Name screen 1400 illustrated in FIG. 10 is called from the scan setting screen 1200 illustrated in FIG. 9, the CPU 211 divides [/Student/Aaron Smith/Contract] illustrated in FIG. 9 into [Student], [Aaron Smith], and [Contract].

In step S2080, the CPU 211 acquires the character string of the folder in the bottom layer of the folder path.

In step S2090, the CPU 211 determines whether the character string has been acquired. When it is determined that the relevant character string has been acquired (YES in step S2090), the processing proceeds to step S2100. On the other hand, when it is determined that the relevant character string has not been acquired (NO in step S2090), the processing proceeds to step S2130.

In step S2100, the CPU 211 determines whether the acquired character string is usable for a file name. For example, if a character unusable for a file name in Windows (registered trademark), such as "*" and "?", is included, or if the character string exceeds a fixed length, the CPU 211 determines that the character string is unusable for a file name.

When the CPU 211 determines that the acquired character string is usable for a file name (YES in step S2100), the processing proceeds to step S2110. On the other hand, when the CPU 211 determines that the acquired character string is not usable for a file name (NO in step S2100), the processing proceeds to step S2120.

In step S2110, the CPU 211 adds the acquired character string as button information.

In step S2120, the CPU 211 acquires the character string of the folder in one-level upper layer of the folder path, and the processing proceeds to step S2090.

As a result of repeating step S2080 and steps S2090 to S2120, [Contract] is stored as the fifth line, [Aaron Smith] is stored as the sixth line, and [Student] is stored as the seventh line in the example illustrated in FIG. 14.

In step S2130, the CPU 211 generates screen information for arranging buttons based on the button information illustrated in FIG. 14, and displays on the operation unit 220 the Change File Name screen 1400 illustrated in FIG. 10 according to the screen information. Although the present exemplary embodiment is described to display buttons in order of the date and time, the character strings registered in advance, and the character strings included in the folder path, the character strings may be displayed in different orders. Further, the user may preset priority to be displayed to the date and time, the character strings registered in advance, and the character strings included in the folder path, and display these character strings from the upper left position of the [File Name Candidates] area 1404 in order of the set priority.

According to the above-described exemplary embodiment, the user can easily set a name of a file to be stored in a folder by using the character string indicating the folder name of the relevant folder or by using the character strings of the folders included in the folder path up to the relevant folder. In particular, the user can select the character string indicating the folder name of the relevant folder or the character strings of the folders included in the folder path up to the relevant folder, and set the resultant character string as a file name. For example, in the above-described example, since [/Student/Aaron Smith/Contract] is specified as a file storage destination, [Student], [Aaron Smith], and [Contract] can easily be set as a file name. On the other hand, when [/Student/Abigail Johnson/Test] is specified as a file storage destination, [Student], [Abigail Johnson], and [Test] are displayed as file name candidate buttons. Further, when [/Student/Aaron Smith] is specified as a file storage destination, [Student] and [Aaron Smith] are displayed as file name candidate buttons. Further, when [/Other/Advertisement] is specified as a file storage destination, [Other] and [Advertisement] are displayed as file name candidate buttons. Then, by selecting each individual file name candidate button that is displayed, the user can easily set a file name in the storage destination folder by using the character string indicating the folder name of the relevant folder or by using the character strings of the folders included in the folder path up to the relevant folder. In many cases, a file to be stored in each folder is a file related to the character string indicating the folder name of the relevant folder or to the character strings of the folders included in the folder path up to the relevant folder. Therefore, the user can easily set to each file a file name suitable for the use of the relevant folder.

The number of repetitions of processing in steps S2090, S2100, S2110, and S2120 of the flowchart illustrated in FIG. 12 may be limited to a predetermined number of times.

Although the present exemplary embodiment is described to directly acquire a folder path, the present invention is not limited thereto. For example, a setting file which records for each folder illustrated in FIG. 15 the folder path from the root folder to the relevant folder may be stored. Then, when starting the processing of the flowchart illustrated in FIG. 12, the CPU 211 may receive the setting file from the relevant folder of the file server 102 and then read the folder path from the received setting file to acquire the folder path.

A second exemplary embodiment will be described below. The above-described exemplary embodiment is described to select character strings for setting a file name from a plurality of character string candidates. In the present exemplary embodiment, the MFP 101 displays a plurality of character strings as file name candidates based on the folder path of the folder selected as a file storage destination.

Screens other than the scan setting screen 1200 illustrated in FIG. 9 are similar to those according to the first exemplary embodiment, and detailed descriptions thereof will be omitted.

Unlike the first exemplary embodiment, in the second exemplary embodiment, a folder named [Berkely] is provided in one-level upper layer of the folder [Student]. Further, in the second exemplary embodiment, the scan setting screen 1200 illustrated in FIG. 16 is displayed on the operation unit 220 instead of the scan setting screen 1200 illustrated in FIG. 9 displayed in the first exemplary embodiment.

Figure 16:
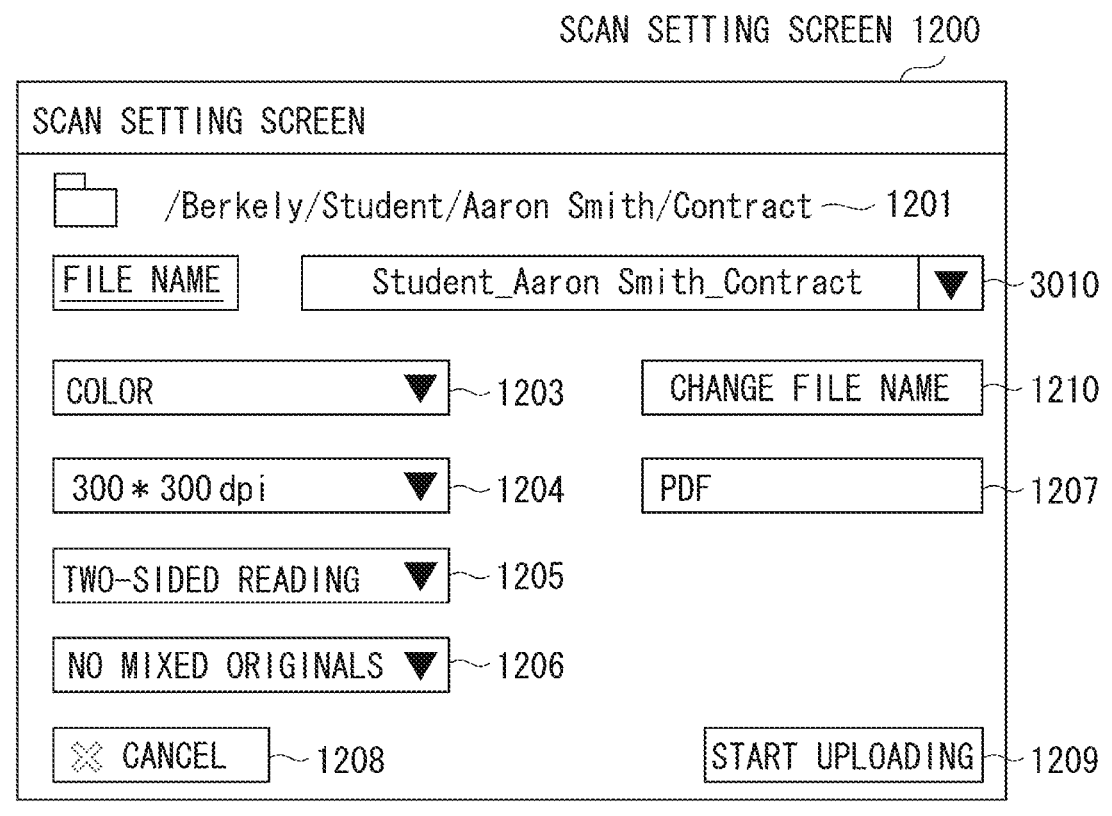

The scan setting screen 1200 illustrated in FIG. 16 differs from the scan setting screen 1200 illustrated in FIG. 9 in that a pull-down menu calling button 3010 is displayed at the right end of the [File Name] area 1202. When the user selects the pull-down menu calling button 3010, a pull-down menu illustrated in FIG. 17 is displayed.

The pull-down menu illustrated in FIG. 17 is a list of file name candidates generated by the CPU 211.

Figure 18:
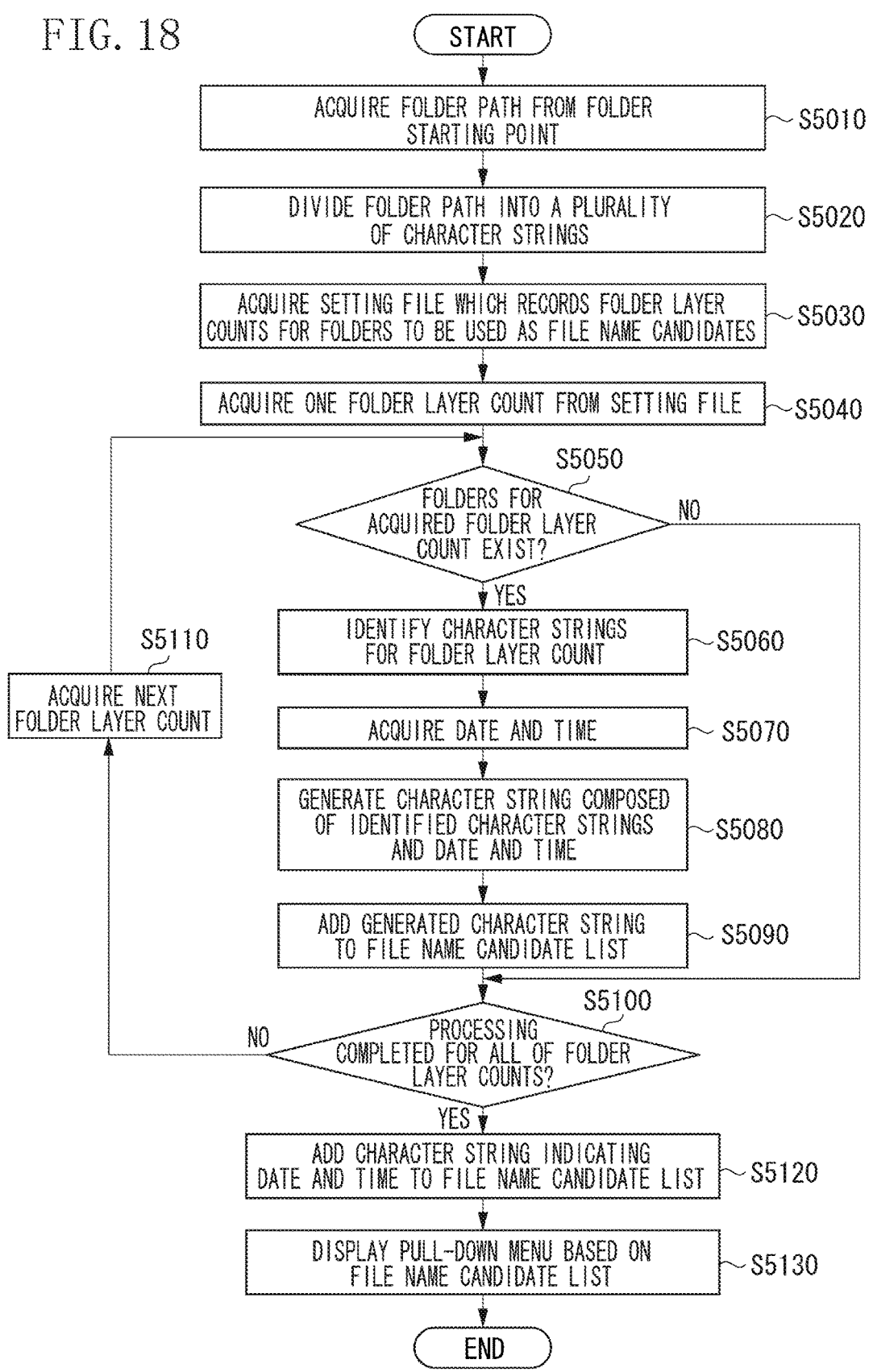
FIG. 18 is a flowchart illustrating an example of control according to the present exemplary embodiment.

FIG. 18 is a flowchart illustrating processing performed by the CPU 211 when the user selects the pull-down menu calling button 3010 illustrated in FIG. 16. Each operation (step) in the flowchart illustrated in FIG. 18 is implemented when the CPU 211 of the MFP 101 executes a control program stored in the HDD 214.

In step S5010, the CPU 211 acquires the folder path from the folder path's starting point. In the example illustrated in FIG. 16, [/Berkely/Student/Aaron Smith/Contract] is acquired.

In step S5020, the CPU 211 delimits the character string included in the folder path acquired in step S5010 with slashes "/" to divide the relevant character string into a plurality of character strings. When the user presses the pull-down menu 3010 in the scan setting screen 1200 illustrated in FIG. 16, the CPU 211 performs control as follows. More specifically, the CPU 211 divides [/Berkely/Student/Aaron Smith/Contract] into [Berkely], [Student], [Aaron Smith], and [Contract].

Figure 19:
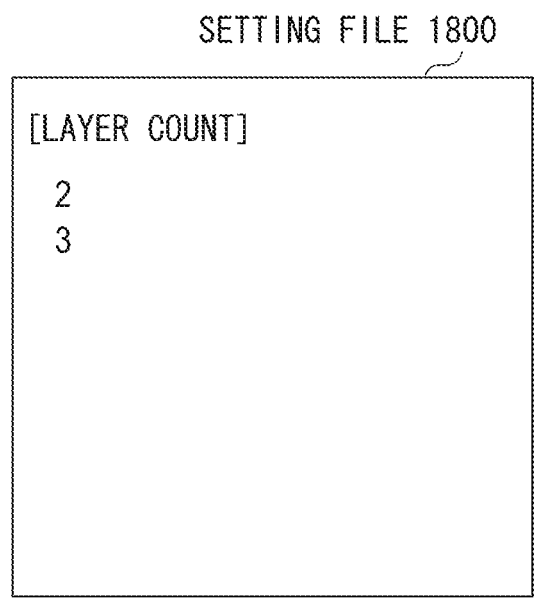
FIG. 19 illustrates a setting file according to the present exemplary embodiment.

In step S5030, the CPU 211 acquires a setting file which records folder layer counts for folders to be used as file name candidates. FIG. 19 illustrates an example of a setting file 1800. The setting file 1800 may be acquired by reading relevant settings registered in advance in the HDD 214. Further, the setting file 1800 may be acquired by receiving a setting file stored in a folder selected as a file storage destination. In the present exemplary embodiment, and "3" are stored as folder layer counts.

In step S5040, the CPU 211 acquires one folder layer count from the setting file 1800 acquired in step S5030. First of all, "2" is acquired.

In step S5050, the CPU 211 determines whether there exist folders for the folder layer count acquired in step S5040. When it is determined that folders for the folder layer count exist (YES in step S5050), the processing proceeds to step S5060. On the other hand, when it is determined that folders for the folder layer count does not exist (NO in step S5050), the processing proceeds to step S5100.

In step S5060, the CPU 211 identifies character strings for the folder layer count acquired in step S5040, starting with the folder in the bottom layer of the folder path displayed in the area 1201 illustrated in FIG. 16. When the user presses the pull-down menu 3010 in the scan setting screen 1200 illustrated in FIG. 16, the folder name [Contract] of the folder in the bottom layer and the folder name [AaronSmith] in one-level upper layer are identified.

In step S5070, the CPU 211 acquires the date and time from a timer (not illustrated).

In step S5080, the CPU 211 generates a character string composed of the character strings identified in step S5060 and the date and time acquired in step S5070. When the user presses the pull-down menu 3010 in the scan setting screen 1200 illustrated in FIG. 16, [Aaron Smith_Contract_20140303120000] is generated.

In step S5090, the CPU 211 adds the generated character string to the file name candidate list.

In step S5100, the CPU 211 determines whether processing is completed for all of the folder layer counts recorded in the setting file 1800 acquired in step S5030. When the CPU 211 determines that processing is not completed (NO in step S5100), the processing proceeds to step S5110. On the other hand, when the CPU 211 determines that processing is completed (YES in step S5100), the processing proceeds to step S5120.

In step S5110, the CPU 211 acquires the next folder layer count from the setting file 1800 acquired in step S5030. When using the setting file 1800 illustrated in FIG. 19, "3" following "2" is acquired. Thus, the CPU 211 adds character strings for the folder layer counts recorded in the setting file 1800 to the file name candidate list.

In step S5120, the CPU 211 adds a character string indicating the date and time to the file name candidate list.

In step S5130, the CPU 211 displays the pull-down menu 3010 on the operation unit 220 based on the file name candidate list.

FIG. 17 illustrates an example of a screen displayed by processing according to the present exemplary embodiment.

The pull-down menu 3010 displays [Aaron Smith_Contract_20140303120000], [Student_Aaron Smith_Contract_20140303120000], and [20140303120000]. These character strings are generated and displayed by the processing of the flowchart illustrated in FIG. 18.

The user can select a desired file name from these character strings.

Then, when the user presses the [Start Uploading] key 1209, the CPU 211 instructs the scanner 222 to read a document according to the reading parameters set by using the operation keys 1203 to 1207. Then, the CPU 211 converts the read image data into an image file, assigns the file name displayed in the [File Name] area 1202 to the image file, and transmits the relevant image file to the file server 102.

According to the present exemplary embodiment, the user can easily set a file name of a file to be stored in a folder by using the character string indicating the folder name of the relevant folder or by using the character strings of the folders included in the folder path up to the relevant folder. In particular, the user can easily set a file name by selecting it from the file name candidates automatically generated by the CPU 211 based on the character string indicating the folder name of the relevant folder or the character strings of the folders included in the folder path up to the relevant folder.

The above-described example is described to select [/Berkely/Student/Aaron Smith/Contract] as a file storage destination, and to display [Aaron Smith_Contract_20140303120000], [Student_Aaron Smith_Contract_20140303120000], and [20140303120000].

Meanwhile, the CPU 211 stores the same setting file in [/Berkely/Teacher/Hajime Ogawa/Schedule]. When [/Berkely/Teacher/Hajime Ogawa/Schedule] is selected on the same date and time, the following character strings are displayed as file name candidates according to the processing of the flowchart illustrated in FIG. 18: [Hajime Ogawa_Schedule_20140303120000], [Teacher_Hajime Ogawa_Schedule_20140303120000], and [20140303120000].

Further, the setting file storing "2" as the folder layer count is stored in the [/Berkely/Student/Aaron Smith/Contract]. When [/Berkely/Student/Aaron Smith/Contract] is selected as a file storage destination, the following character strings are displayed as file name candidates according to the processing of the flowchart illustrated in FIG. 18: [Aaron Smith_Contract_20140303120000] and [20140303120000].

Although the present exemplary embodiment is described to include the date and time information in the file name in step S5070, it is not necessary to include the date and time information in the file name. In this case, it is only necessary to skip the processing in step S5070. Further, although the present exemplary embodiment is described to add a file name composed only of the date and time information to the file name candidate list in step S5120, it is not necessary to add a file name composed only of the date and time information to the file name candidate list. In this case, it is only necessary to skip the processing in step S5120.

In the third exemplary embodiment, when the user selects the pull-down menu calling button 3010, file name candidates are displayed as a pull-down menu according to a setting file different from the one according to the second exemplary embodiment.

The following describes only differences between the third exemplary embodiment and the second exemplary embodiment.

In the third exemplary embodiment, when the user selects the pull-down menu calling button 3010 illustrated in FIG. 16, the scan setting screen 1200 illustrated in FIG. 21 is displayed based on a setting file 1600 illustrated in FIG. 20, instead of the scan setting screen 1200 illustrated in FIG. 17.

In the setting file 1600, ChangeOfAddress 1602, ChangeOfClass 1603, and Registration 1604 are recorded for [KEYWORD] 1601, and <key:1>(<path:4>_<path:2>) 1606, <key:2>(<path:4>_<path:2>) 1607, and <key:3>(<path:3>_<path:2>) 1608 are recorded for [RULE] 1605. The contents of the setting file 1600 can be updated, and a setting file having different contents can be stored for each folder.

Figure 22:
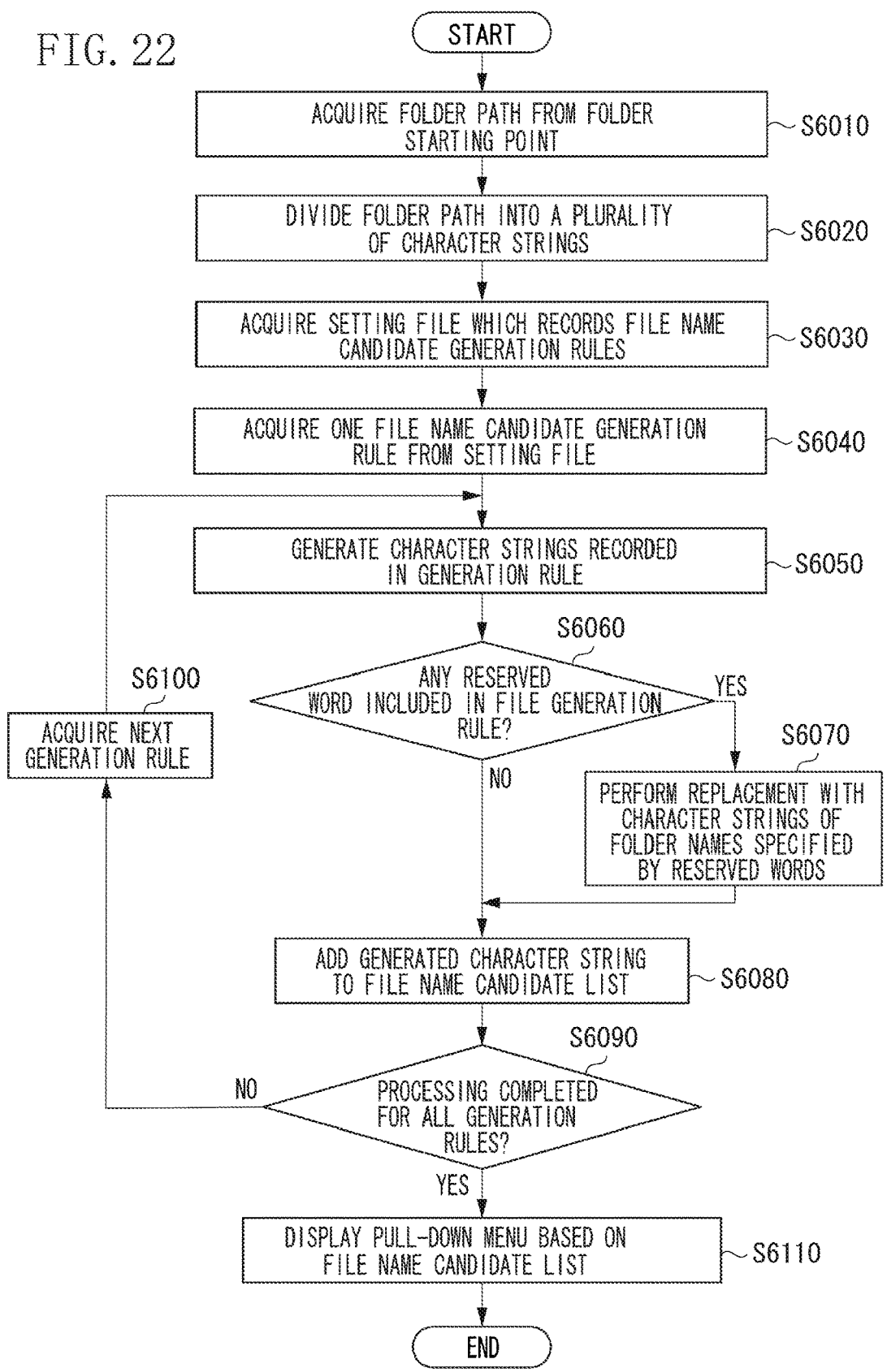
FIG. 22 is a flowchart illustrating an example of control according to the present exemplary embodiment.

FIG. 22 is a flowchart illustrating processing performed when the pull-down menu calling button 3010 illustrated in FIG. 16 is selected. Each operation (step) in the flowchart illustrated in FIG. 22 is implemented when the CPU 211 of the MFP 101 executes a control program stored in the HDD 214.

In step S6010, the CPU 211 acquires the folder path from the folder path's starting point. In the example illustrated in FIG. 16, [/Berkely/Student/Aaron Smith/Contract] is acquired.

In step S6020, the CPU 211 delimits the character string included in the folder path acquired in step S6010 with slashes "/" to divide the relevant character string into a plurality of character strings. When the user presses the pull-down menu 3010 in the scan setting screen 1200 illustrated in FIG. 16, [/Berkely/Student/Aaron Smith/Contract] is divided into [Berkely], [Student], [Aaron Smith], and [Contract].

In step S6030, the CPU 211 acquires a setting file which records file name candidate generation rules. FIG. 20 illustrates an example of the setting file 1600. The setting file 1600 may be acquired by reading relevant settings registered in advance in the HDD 214. Further, the setting file 1600 may be acquired by receiving a setting file stored in a folder selected as a file storage destination.

In step S6040, the CPU 211 acquires one file name candidate generation rule from the setting file 1600 acquired in step S6030. First of all, <key:1>(<path:4>_<path:2>) 1606 is acquired from [RULE] 1605.

In step S6050, the CPU 211 generates character strings described in the generation rule acquired in step S6040, and stores them in the RAM 213.

In step S6060, the CPU 211 determines whether any reserved word is included in the file name candidate generation rule. A reserved word refers to a character string enclosed in angle brackets "<" and ">." In the example illustrated in FIG. 20, <key:1> and <path:4> are reserved words. When it is determined that any reserved word is included in the file name candidate generation rule (YES in step S6060), the processing proceeds to step S6070. On the other hand, when it is determined that any reserved word is not included in the file name candidate generation rule (NO in step S6060), the processing proceeds to step S6080.

In step S6070, the CPU 211 identifies the character strings specified by the reserved words. For example, the CPU 211 replaces "<key:1>" described in a line 1606 in the setting file 1600 illustrated in FIG. 20 with the character string "ChangeOfAddress" defined as a first keyword for [KEYWORD] 1601. The CPU 211 counts the selected folder as a folder in one-level upper layer, and replaces "<path:4>" described in the line 1606 with [Berkely] corresponding to the character string of the folder in four-level upper layer.

According to the above-described rule, the CPU 211 replaces the character string "<key:1>(<path:4>_<path:2>)" described in the line 1606 with "ChangeOfAddress(Berkely_Aaron Smith)."

In step S6080, the CPU 211 adds the generated character string to the file name candidate list.

In step S6090, the CPU 211 determines whether processing is completed for all of the file name candidate generation rules recorded in the setting file 1600 acquired in step S6030. When the CPU 211 determines that processing is completed (YES in step S6090), the processing proceeds to step S6110. On the other hand, when the CPU 211 determines that processing is not completed (NO in step S6090), the processing proceeds to step S6100.

In step S6110, the CPU 211 displays a pull-down menu on the operation unit 220 based on the file name candidate list.

The user can select and set a desired file name from the pull-down menu.

When the user presses the [Start Uploading] key 1209, the CPU 211 instructs the scanner 222 to read a document according to the reading parameters set by using the operation keys 1203 to 1207. Then, the CPU 211 converts the read image data into an image file, assigns the file name displayed in the [File Name] area 1202 to the image file, and transmits the relevant image file to the file server 102.

According to the present exemplary embodiment, the user can easily set a name of a file to be stored in a folder by using the character string indicating the folder name of the relevant folder or by using the character strings of the folders included in the folder path up to the relevant folder. In particular, the user can easily set a file name by selecting it from the file name candidates automatically generated by the CPU 211 based on the character string indicating the folder name of the relevant folder or the character strings of the folders included in the folder path up to the relevant folder.

The above-described exemplary embodiment is described to select [/Berkely/Student/Aaron Smith/Contract] as a file storage destination, and to display the character strings in the pull-down menu illustrated in FIG. 21 as file name candidates through the processing of the flowchart illustrated in FIG. 22 according to the setting file 1600 illustrated in FIG. 20. The displayed character strings can be changed by updating keywords and generation rules in the setting file by the administrator or the user. Further, even if a setting file storing the same generation rule and the same keyword is used, the character strings to be displayed in the pull-down menu change depending on the folder in which the setting file is stored and on the folder name of the relevant folder or the character strings included in the folder path up to the relevant folder.

The CPU 211 may display on the operation unit 220 the file name candidate list generated in the second exemplary embodiment and the file name candidate list generated in the third exemplary embodiment together in a screen as illustrated in FIG. 23.

Other Embodiments

Although the above-described exemplary embodiments are described to have the MFP 100 and the file server 102 as different apparatuses, functions of the file server 102 may be included in the MFP 100.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-138142, filed Jul. 3, 2014, which is hereby incorporated by reference herein in its entirety.

What is claimed is:

1. An information processing apparatus comprising:
a user interface;
a memory for storing a computer program; and
at least one processor for executing the computer program to perform:
specifying, among a plurality of folders based on a user's instruction received at the user interface, a folder into which a file is to be stored;
generating a plurality of character string candidates from a folder path of the specified folder by dividing the folder path of the specified folder into the plurality of character string candidates;
displaying, within the user interface, a list of the generated plurality of character string candidates for setting a new file name of the file;
selecting, based on a user's selecting operation received at the user interface, at least one character string candidate from the list of the plurality of character string candidates displayed within the user interface; and
setting, to the file stored in the specified folder, the new file name which is generated based on the selected at least one character string candidate by sorting the selected at least one character string candidate in an order that the user selected the at least one character string candidate from the list of the plurality of character string candidates displayed within the user interface.

2. The information processing apparatus according to claim 1, wherein, if at least two of character string candidates are selected from the displayed list of the plurality of character string candidates, setting, to the file stored in the specified folder, the new file name which is generated by inserting a specific sign between the sorted selected at least two character string candidates.

3. The information processing apparatus according to claim 2, wherein the at least one processor executes the computer program to further perform: changing the specific sign based on a user's instruction.

4. The information processing apparatus according to claim 1, wherein the at least one processor executes the computer program to further perform: transmitting the file having the set new file name.

5. The information processing apparatus according to claim 1, wherein the at least one processor executes the computer program to further perform: storing the file having the set new file name into the specified folder.

6. The information processing apparatus according to claim 1, wherein the at least one processor executes the computer program to further perform: registering second character string candidates in advance,
wherein, in addition to the character string candidates generated from the folder path of the specified folder, the registered second character string candidates are displayed in the list of the character string candidates within the user interface for setting the new file name of the file.

7. The information processing apparatus according to claim 1, wherein the at least one processor executes the computer program to further perform: acquiring a date and a time,
wherein, in addition to the character string candidates generated from the folder path of the specified folder, the acquired date and time are displayed in the list of the character string candidates within the user interface for setting the new file name of the file.

8. The information processing apparatus according to claim 1, further comprising:
a reading unit configured to read a document to obtain image data; and
a generation unit configured to generate the file based on the image data of the document read by the reading unit.

9. The information processing apparatus according to claim 1, wherein the at least one processor executes the computer program to further perform receiving a setting file stored in the specified folder,
wherein the plurality of character string candidates are generated by dividing the folder path of the specified folder based on the received setting file.

10. The information processing apparatus according to claim 9, wherein the setting file includes information indicating a display order of character string candidates for setting the file name of the file, and
wherein the generated plurality of character string candidates are displayed according to the display order.

11. A method executed by an information processing apparatus including a user interface, the method comprising:
specifying, among a plurality of folders based on a user's instruction received at the user interface, a folder into which a file is to be stored;
generating a plurality of character string candidates from a folder path of the specified folder by dividing the folder path of the specified folder into the plurality of character string candidates;
displaying, within the user interface, a list of the generated plurality of character string candidates for setting a new file name of the file;
selecting, based on a user's selecting operation received at the user interface, at least one character string candidate from the list of the plurality of character string candidates; and
setting, to the file stored in the specified folder, the new file name which is generated based on the selected at least one character string candidate by sorting the selected at least one character string candidate in an order that the user selected the at least one character string candidate from the list of the plurality of character string candidates displayed within the user interface.

12. A non-transitory storage medium storing a program for causing a computer to execute a method for controlling an information processing apparatus, the program comprising:

specifying, among a plurality of folders based on a user's instruction received at the user interface, a folder into which a file is to be stored;

generating a plurality of character string candidates from a folder path of the specified folder by dividing the folder path of the specified folder into the plurality of character string candidates;

displaying, within the user interface, a list of the generated plurality of character string candidates for setting a new file name of the file;

selecting, based on a user's selecting operation received at the user interface, at least one character string candidate from the list of the plurality of character string candidates; and setting, to the file stored in the specified folder, the new file name which is generated based on the selected at least one character string candidate by sorting the selected at least one character string candidate in an order that the user selected the at least one character string candidate from the list of the plurality of character string candidates displayed within the user interface.

13. The information processing apparatus according to claim 1, wherein the plurality of character string candidates are acquired by dividing the folder path of the specified folder with slashes.

14. The information processing apparatus according to claim 1, wherein the list of the acquired plurality of character string candidates are displayed with buttons corresponding to the generated plurality of character string candidates, and wherein the user's selecting operation is a selection of at least one desired button from the displayed buttons within the user interface.

* * * * *